US012784323B2

(12) United States Patent
Brennan et al.

(10) Patent No.: US 12,784,323 B2
(45) Date of Patent: Nov. 3, 2026

(54) TILE-BASED IMMEDIATE MODE RENDERER GRAPHICS PIPELINE WITH PER-TILE DEPTH PRE-PASSES

(71) Applicant: ADVANCED MICRO DEVICES, INC., Santa Clara, CA (US)

(72) Inventors: Christopher J. Brennan, Boxborough, MA (US); Dana Schaa, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 121 days.

(21) Appl. No.: 18/621,768

(22) Filed: Mar. 29, 2024

(65) Prior Publication Data

US 2025/0308132 A1 Oct. 2, 2025

(51) Int. Cl.
*G06T 15/00* (2011.01)
*G06T 15/40* (2011.01)

(52) U.S. Cl.
CPC .......... *G06T 15/005* (2013.01); *G06T 15/405* (2013.01)

(58) Field of Classification Search
CPC ............................ G06T 15/005; G06T 15/405
See application file for complete search history.

(56) References Cited

U.S. PATENT DOCUMENTS

| | | | |
|---|---|---|---|
| 7,170,515 B1 | 1/2007 | Zhu | |
| 8,537,168 B1 | 9/2013 | Steiner et al. | |
| 9,101,092 B2 * | 8/2015 | Verhaeghe | A01F 15/0825 |
| 10,235,735 B2 | 3/2019 | Venkatesh et al. | |
| 11,062,506 B2 | 7/2021 | Lauritzen et al. | |
| 11,551,400 B2 | 1/2023 | Surti et al. | |
| 2008/0030513 A1 | 2/2008 | Jiao et al. | |
| 2012/0026171 A1 | 2/2012 | Danskin et al. | |
| 2013/0021358 A1 | 1/2013 | Nordlund et al. | |
| 2014/0267344 A1 | 9/2014 | Wilson et al. | |
| 2014/0267376 A1 | 9/2014 | Bolz et al. | |
| 2014/0333620 A1 | 11/2014 | Park et al. | |
| 2015/0062154 A1 | 3/2015 | Ellis et al. | |
| 2015/0213638 A1 | 7/2015 | Dimitrov et al. | |

(Continued)

FOREIGN PATENT DOCUMENTS

| | | |
|---|---|---|
| EP | 3316143 A2 | 5/2018 |
| GB | 2580166 B | 7/2020 |

OTHER PUBLICATIONS

Non-Final Office Action mailed Sep. 18, 2025 for U.S. Appl. No. 18/615,035, 23 pages.

(Continued)

*Primary Examiner* — Michelle Chin

(57) ABSTRACT

To render a batch of primitives, an acceleration unit (AU) first partitions a frame to be rendered into two or more tiles. For each primitive of the batch of primitives, the AU then determines whether the primitive is at least partially visible in each tile of the frame. Based on a primitive being at least partially visible in a tile, the AU stores geometry data of the primitive in the tile in a corresponding per-tile queue allocated to the tile. For each tile and using the geometry data in the per-tile queue allocated to the tile, the AU then performs one or more depth sub-passes to generate depth pre-pass data that is stored in the per-tile queue allocated to the tile. The AU then renders the batch of primitives based on the depth pre-pass data stored in the per-tile queues.

20 Claims, 6 Drawing Sheets

(56) References Cited

U.S. PATENT DOCUMENTS

| | | | | |
|---|---|---|---|---|
| 2016/0110914 | A1 | 4/2016 | Cho et al. | |
| 2016/0117855 | A1 | 4/2016 | Lee et al. | |
| 2016/0148424 | A1 | 5/2016 | Chung et al. | |
| 2017/0053375 | A1 | 2/2017 | Bolz | |
| 2017/0161863 | A1 | 6/2017 | Baral et al. | |
| 2018/0307490 | A1 | 10/2018 | Hakura et al. | |
| 2020/0058263 | A1 | 2/2020 | Mckeever et al. | |
| 2020/0193703 | A1 | 6/2020 | Favela et al. | |
| 2021/0110510 | A1* | 4/2021 | Brigg | G06T 1/60 |
| 2022/0245751 | A1 | 8/2022 | Langtind et al. | |
| 2023/0260074 | A1 | 8/2023 | Brigg et al. | |
| 2023/0298249 | A1 | 9/2023 | Shao et al. | |
| 2024/0104685 | A1 | 3/2024 | Wu et al. | |
| 2024/0169643 | A1 | 5/2024 | Stepuch et al. | |
| 2025/0265673 | A1 | 8/2025 | Sansottera et al. | |

OTHER PUBLICATIONS

Non-Final Office Action mailed Oct. 1, 2025 for U.S. Appl. No. 18/621,774, 35 pages.

International Search Report and Written Opinion mailed Jun. 26, 2025 for PCT/US2025/020329, 11 pages.

International Search Report and Written Opinion mailed Jun. 28, 2025 for PCT/US2025/020837, 10 pages.

U.S. Appl. No. 18/621,722, filed Mar. 29, 2024, listing Christopher J. Brennan as inventor, entitled "Tile-Based Immediate Mode Renderer Graphics Pipeline".

U.S. Appl. No. 18/621,774, filed Mar. 29, 2024, listing Christopher J. Brennan as inventor, entitled "Tile-Based Immediate Mode Renderer Graphics Pipeline With Pixel Circuitry Balancing".

U.S. Appl. No. 18/615,035, filed Mar. 25, 2024, listing Christopher J. Brennan as inventor, entitled "Local Shader Engine Geometry and Attribute Shading".

Final Office Action mailed Jan. 30, 2026 for U.S. Appl. No. 18/615,035, 38 pages.

Non-Final Office Action mailed Feb. 24, 2026 for U.S. Appl. No. 18/621,722, 19 pages.

Final Office Action mailed Mar. 27, 2026 for U.S. Appl. No. 18/621,774, 43 pages.

* cited by examiner

TILE-BASED IMMEDIATE MODE RENDERER GRAPHICS PIPELINE WITH PER-TILE DEPTH PRE-PASSES

BACKGROUND

In a graphics processing system, three-dimensional scenes are rendered by graphics processing units (GPUs) for display on two-dimensional displays. To render such scenes, a GPU receives a command stream from an application indicating various primitives to be rendered. The GPU then renders these primitives according to a graphics pipeline that has various stages each including instructions to be performed by the GPU. For example, some graphics pipelines include a visibility pass wherein the GPU sorts each primitive to be rendered into a bin based on which tile of the scene the primitive is visible in. The GPU then renders the primitives in each bin sequentially. As an example, the GPU renders the primitives in a first bin before rendering the primitives in a second bin. After rendering the primitives, the graphics processing system displays the rendered primitives as part of a three-dimensional scene displayed in a two-dimensional display.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
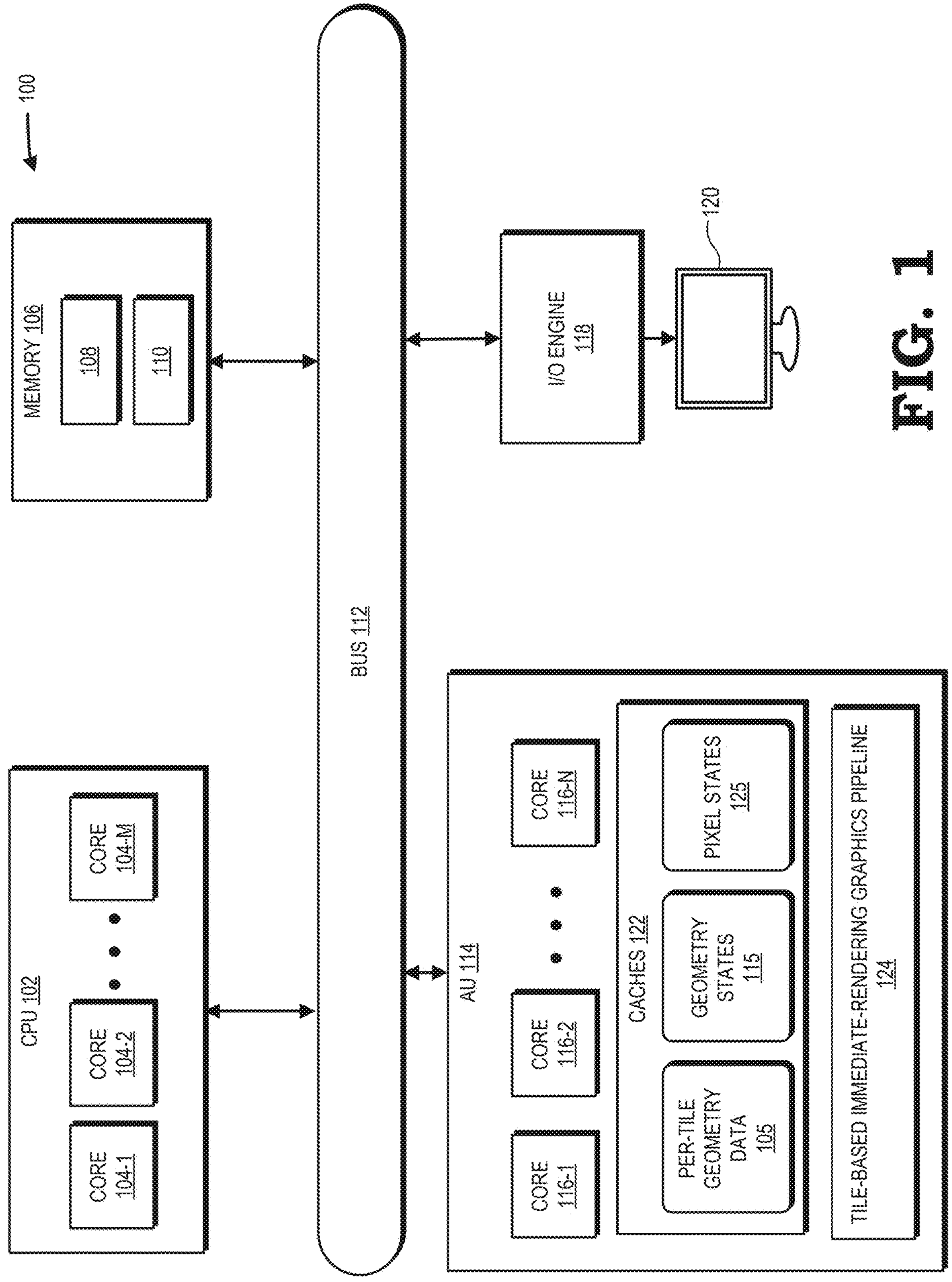
FIG. 1 is a block diagram of a processing system configured to implement a tile-based immediate mode renderer graphics pipeline with per-tile depth pre-passes, in accordance with embodiments.

Systems and techniques disclosed herein are directed towards a processing system configured to implement a tile-based immediate mode renderer graphics pipeline with per-tile depth pre-passes. Such a tile-based immediate mode renderer graphics pipeline is a graphics pipeline that includes first partitioning a frame to be rendered into two or more tiles. Further, the tile-based immediate mode renderer graphics pipeline includes determining which primitives of the frame to be rendered are at least partially visible in each tile and then sequentially rendering the primitives at least partially visible in each tile. For example, for a first tile of the frame, the tiled-based immediate mode renderer graphics pipeline includes performing one or more depth pre-passes on primitives of a batch of primitives at least partially visible in the first tile and then rendering, to one or more per-pixel color buffers (PPC buffers), pixel attribute data (e.g., locations, colors) associated with the primitives of the batch of primitives at least partially visible in the first tile. The tile-based immediate mode renderer graphics pipeline then includes determining, based on pixel attribute data in the PPC buffers, lighting values (e.g., intensity values) for the pixels of the primitives at least partially visible in the first tile. The resulting pixel data and lighting data are then stored in a frame buffer and this process is repeated for each tile of the frame.

To implement such a tile-based immediate mode renderer graphics pipeline with per-tile depth pre-passes, a processing system includes an acceleration unit (AU) configured to receive a command stream from an application being executed by the processing system. The command stream, for example, includes data indicating the primitives to be rendered for each frame of a series of frames. As an example, for a first frame of a set of frames, the command stream includes data including one or more commands (e.g., draw commands, shading commands), geometry states, one or more pixel states, and data (e.g., vertices) indicating one or more primitives to be rendered in the frame. These geometry states include data (e.g. parameters) to initialize and dictate the tile-based immediate mode renderer graphics pipeline, geometry stages of the tile-based immediate mode renderer graphics pipeline, or both. Additionally, the pixel states include data (e.g., parameters) to initialize and dictate tile draw stages and tile lighting stages of the tile-based immediate mode renderer graphics pipeline. Such stages (e.g., geometry stages, tile draw stages, tile lighting stages) of the tile-based immediate mode renderer graphics pipeline each include sets of commands (e.g., draw commands, shading commands), geometry states, pixel states, or any combination thereof indicated in the command stream that use the same resources (e.g., same primitive data). Based on receiving the command stream, the AU first partitions the frame to be rendered into two or more tiles. Further, the AU allocates a corresponding per-tile queue to each tile of the frame. The AU then performs a geometry stage of the pipeline. During such a geometry stage, the AU determines which primitives of the frame are at least partially visible in each tile of the frame. Based on a primitive being at least partially visible in a tile, the AU stores geometry data indicating vertex data, shading data, positioning data, or any combination thereof of the primitive in the per-tile queue allocated to the tile.

After the AU has determined whether each primitive of a batch of primitives is at least partially visible in a first tile of the frame, the AU initiates a tile pre-pass stage of the tile-based immediate mode renderer graphics pipeline for the first tile. During the tile pre-pass stage for the first tile, the AU determines pixel depth data for the primitives at least partially visible in the first tile. For example, based on geometry data stored in the per-tile queue allocated to the first tile, the AU determines pixel depth data that indicates the depth values of pixels in the primitives at least partially visible in the first tile. The AU then performs, based on pixel depth data that indicates the depth values of pixels in the primitives at least partially visible in the first tile, one or more depth sub-pass operations (screen space ambient occlusion (SSAO) operations, screen space reflection (SSR) operations, occlusion culling operations) each one or more times to generate depth pre-pass data that includes textures (e.g., SSAO textures, SSR textures) for the first tile, data indicating one or more culled pixels, data indicating one or more culled primitives, or any combination thereof. As an example, for a tile pre-pass stage for the first tile, the AU performs a first depth sub-pass operation (e.g., occlusion culling operation) as indicated in a first set of pixel states and a second depth sub-pass operation, different from the first depth sub-pass operation, as indicated in a second set of pixel states. After performing one or more depth sub-pass operations of the tile pre-pass stage for the first tile, the AU stores the resulting depth pre-pass data in the per-tile queue allocated to the first tile and begins a tile draw stage for the first tile.

During the tile draw stage for the first tile, the AU renders the primitives at least partially visible in the first tile into one or more PPC buffers based on the geometry data, depth pre-pass data, or both stored in the per-tile queue allocated to the first tile. That is to say, based on the geometry data, depth pre-pass data, or both stored in the per-tile queue allocated to the first tile, the AU determines pixel attribute data indicating, for example, the position and color of the pixels of the primitives of a batch of primitives at least partially visible in the first tile. Once such pixel attribute data associated with the first tile is written to the PPC buffers, the AU performs a tile lighting stage of the tile-based immediate mode renderer graphics pipeline for the first tile. During the tile lighting stage for the first tile, the AU is configured to, based on the pixel attribute data associated with the first tile in the PPC buffers, determine lighting data (e.g., intensity data) for each pixel of the primitives at least partially visible in the first tile. The AU then stores, based on the lighting data for each pixel, data representing the color for each pixel of the primitives at least partially visible in the first tile to a frame buffer for display. The AU next performs tile pre-pass stages, tile draw stages, and tile lighting stages for the remaining tiles of the frame so as to render the batch of primitives.

In this way, the processing system implements the tile-based immediate mode renderer graphics pipeline with per-tile depth pre-passes. Because, within the tile-based immediate mode renderer graphics pipeline, the AU renders primitives based on a single command stream from an application, the processing system is not required to manage in-memory state objects to allow access to stored states by, for example, the AU. As such, the complexity and resources required to render the primitives are reduced, helping to improve processing efficiency. Additionally, because the AU consumes the same geometry data twice from a respective per-tile queue to perform a tile depth pre-pass stage and tile draw stage for a tile, the AU is not required to repeat the assembly and shading of primitives to perform these stages (e.g., groups of commands), helping to reduce the processing resources and processing time needed to render the primitives.

FIG. 1 is a block diagram of a processing system 100 configured to implement a tile-based immediate mode renderer graphics pipeline, according to some implementations. The processing system 100 includes or has access to a memory 106 or other storage component implemented using a non-transitory computer-readable medium, for example, a dynamic random-access memory (DRAM). However, in implementations, the memory 106 is implemented using other types of memory including, for example, static random-access memory (SRAM), nonvolatile RAM, and the like. According to implementations, the memory 106 includes an external memory implemented external to the processing units implemented in the processing system 100. The processing system 100 also includes a bus 112 to support communication between entities implemented in the processing system 100, such as the memory 106. Some implementations of the processing system 100 include other buses, bridges, switches, routers, and the like, which are not shown in FIG. 1 in the interest of clarity.

The techniques described herein are, in different implementations, employed at acceleration unit (AU) 114. AU 114 includes, for example, vector processors, coprocessors, graphics processing units (GPUs), non-scalar processors, highly parallel processors, other multithreaded processing units, scalar processors, serial processors, programmable logic devices (e.g., field-programmable gate arrays) or any combination thereof. In embodiments, AU 114 renders scenes within a screen space (e.g., the space in which a scene is displayed) according to one or more applications 108 for presentation on a display 120. For example, AU 114 renders graphics objects (e.g., sets of primitives) of a scene in a screen space (e.g., display space) to be displayed to produce values of pixels that are provided to the display 120, which uses the pixel values to display a scene that represents the rendered graphics objects. To render these graphics objects, AU 114 implements a plurality of processor cores 116-1 to 116-N that execute instructions concurrently or in parallel. For example, AU 114 executes instructions from one or more graphics pipelines (e.g., tile-base immediate mode renderer graphics pipeline 124) using a plurality of processor cores 116 to render one or more graphics objects. A graphics pipeline, for example, includes one or more steps, stages, or instructions to be performed by AU 114 in order to render one or more graphics objects for a scene. As an example, a graphics pipeline includes data indicating an assembler stage, vertex shader stage, hull shader stage, tessellator stage, domain shader stage, geometry shader stage, binner stage, rasterizer stage, pixel shader stage, output merger stage, or any combination thereof to be performed by one or more processor cores 116 of AU 114 in order to render one or more graphics objects for a scene.

In embodiments, one or more processor cores 116 of AU 114 each operate as a compute unit configured to perform one or more operations for one or more instructions received by AU 114. These compute units each include one or more single instruction, multiple data (SIMD) units that perform the same operation on different data sets to produce one or more results. For example, AU 114 includes one or more processor cores 116 each functioning as a compute unit that includes one or more SIMD units to perform operations for one or more instructions from a graphics pipeline (e.g. tile-based immediate mode renderer graphics pipeline 124). To facilitate one or compute units performing operations for instructions from a graphics pipeline, AU 114 includes one or more command processors (not shown for clarity). Such command processors, for example, include circuitry configured to execute one or more instructions from a graphics pipeline by providing data indicating one or more operations, operands, instructions, variables, register files, or any combination thereof to one or more compute units necessary for, helpful for, or aiding in the performance of one or more operations for the instructions. Though the example implementation illustrated in FIG. 1 presents AU 114 as having three processor cores (116-1, 116-2, 116-N) representing an N number of cores, the number of processor cores 116 implemented in the AU 114 is a matter of design choice. As such, in other implementations, AU 114 can include any number of processor cores 116.

According to embodiments, one or more processor cores 116 of AU 114 each operating as one or more compute units are configured to store results (e.g., data resulting from the performance of one or more instructions, operations, or both) in one or more caches 122, memory 106, or both. Such caches 122, for example, include one or more caches 122 included in or otherwise connected to processor cores 116. As an example, in embodiments, caches 122 includes one or more caches shared between one or more processor cores 116 (e.g., shared caches), one or more caches private to (e.g., only accessibly by) a corresponding processor core 116 (e.g., private caches), or both. For example, according to some embodiments, caches 122 includes a cache hierarchy including one or more private caches, one or more shared caches, or both.

In embodiments, AU 114 is configured to render one or more graphics objects based on tile-based immediate mode renderer graphics pipeline 124 that includes one or more per-tile depth pre-passes. Tile-based immediate mode renderer graphics pipeline 124, for example, includes an immediate mode renderer in which an application 108 issues a command stream including data describing all the graphics objects (e.g., primitives) in a scene to be rendered for each frame to be rendered. For example, in embodiments, a command stream from an application 108 includes data indicating the position of vertices of one or more primitives to be rendered, one or more commands (e.g., draw commands, shader commands), one or more geometry states 115, and one or more pixel states 125. Such geometry states 115, for example, include data (e.g. parameters) to initialize and dictate the tile-based immediate mode renderer graphics pipeline 124, geometry stages of the tile-based immediate mode renderer graphics pipeline 124, or both. As an example, one or more first geometry states 115 indicate parameters, processes, and data used in initializing the tile-based immediate mode renderer graphics pipeline 124, and one or more second geometry states indicate parameters, processes, and data used in a geometry stage of tile-based immediate mode renderer graphics pipeline 124. Additionally, such pixel states 125 include data (e.g., parameters) to initialize and dictate tile draw stages and tile lighting stages of the tile-based immediate mode renderer graphics pipeline 124. For example, one or more first pixel states 125 indicate parameters, processes, and data used in the tile pre-pass stages of the tile-based immediate mode renderer graphics pipeline 124, one or more second pixel states 125 indicate parameters, processes, and data used in the tile draw stages of the tile-based immediate mode renderer graphics pipeline 124, and one or more third pixel states 125 indicate parameters, processes, and data used in the tile lighting stages of the tile-based immediate mode renderer graphics pipeline 124. In embodiments, AU 114 is configured to store the geometry states 115 and pixel states 125 indicated in a command stream in one or more caches 122, memory 106, or both. Further, such geometry stages, tile draw stages, and tile lighting stages of tile-based immediate mode renderer graphics pipeline 124 each represents respective sets of commands (e.g., draw commands), geometry states, and pixel states that use the same resources (e.g., same primitive data) to render primitives of a frame.

According to embodiments, the tile-based immediate mode renderer graphics pipeline 124 includes partitioning a frame to be rendered into two or more tiles and then rendering the graphics objects of the scene tile by tile. For example, based on one or more first geometry states 115 in a received command stream, AU 114 first partitions a frame to be rendered into two or more tiles (e.g., coarse tiles). Each tile, for example, includes a first number of pixels of the frame in a first direction (e.g., horizontal direction) and a second number of pixels of the frame in a second direction (e.g., vertical direction) perpendicular to the first direction indicated by the one or more first geometry states 115. According to some embodiments, a tile includes the same number of pixels in the first and second directions while in other embodiments the tile includes a different number of pixels in the first and second directions. After partitioning the frame to be rendered into two or more tiles, AU 114 then allocates a number of queues formed from at least a portion of caches 122, memory 106, or both to each tile of the frame such that each tile has a corresponding per-tile queue. As an example, AU 114 divides and allocates one or more per-shader engine queues formed from portions of caches 122 such that each tile of the frame is allocated a per-tile queue. Each per-tile queue, for example, includes one or more queues formed from at least a portion of caches 122, memory 106, or both. After AU 114 has allocated a per-tile queue to each tile of the frame, AU 114 begins a geometry stage of tile-based immediate mode renderer graphics pipeline 124 based on one or more second geometry states 115 of the command stream.

The geometry stage, for example, includes a visibility pass in which AU 114 determines which primitives (e.g., graphics objects) are to be rendered for each tile of the frame. For example, based on data indicating vertices of one or more primitives to be rendered in the command stream, AU 114 assembles (e.g., performs an assembly stage) and shades (e.g., performs one or more shaders) the one or more of the indicated primitives. As an example, AU 114 first assembles one or more primitives indicated in the command stream. For each assembled primitive, AU 114 then determines which tiles of the frame the primitive at least partially covers. Based on AU 114 determining that an assembled primitive is at least partially visible in a tile, AU 114 provides geometry data indicating vertex data, shading data, positioning data, or any combination thereof of the primitive to the per-tile queue associated with the tile. According to some embodiments, AU 114 continues to perform the visibility pass until a certain command (e.g., tile flush command) is received from in the command stream, one or more groups of per-tile queues are at a predetermined capacity threshold (e.g., store a predetermined amount of data), or both. After a certain command (e.g., tile flush command) is received from in the command stream, one or more groups of per-tile queues are at a predetermined capacity threshold (e.g., store a predetermined amount of data), or both, AU 114 then renders the group (e.g., batch) of primitives represented by the geometry data stored in the per-tile queues associated with the tiles. The per-tile geometry data of primitives of the batch of primitives at least partially visible in the tiles is represented in FIG. 1 as per-tile geometry data 105.

To render the primitives in the batch of primitives, AU 114 begins a first tile pre-pass stage for the first pixel based on one or more first pixel states 125 indicated in the command stream. As an example, concurrently with continuing the geometry stage, AU 114 begins a first tile pre-pass stage for the first tile based on one or more first pixel states 125. Such a tile pre-pass stage, for example, includes AU 114 performing one or more depth sub-pass operations as indicated by one or more corresponding first pixel states 125 on the primitives of the batch of primitives at least partially visible in a respective tile. As an example, to perform a tile pre-pass stage for the first tile, AU 114 first consumes the per-tile queue associated with the first tile such that AU 114 retrieves the per-tile geometry data 105 stored in the per-tile queue associated with the first tile. AU 114 then performs one or more assembly and shading operations using the per-tile geometry data 105 for the first tile to generate per-tile pixel depth data for the primitives of the batch of primitives at least partially visible in the first tile. Such per-tile pixel depth data, for example, represents the depth of the pixels forming the primitives at least partially visible in the tile. Using the per-tile pixel depth data, AU 114 then performs a first depth sub-pass operation based on a set of one or more pixel states 125 (e.g., a set of one or more first pixel states) indicating parameters (e.g., thresholds) for the first depth sub-pass operation. A depth sub-pass operation includes, for example, an SSAO operation, SSR operation, occlusion culling operation, and the like. As an example, in embodiments, a depth sub-pass operation includes comparing the per-pixel depth values of one or more pixels of the primitives of the batch of primitives at least partially visible in a corresponding tile to one or more thresholds (e.g., minimum depth threshold, maximum depth threshold) indicated by a set of one or more first pixel states 125. As another example, a depth sub-pass operation includes an SSAO operation that generates SSAO data (e.g., textures) for one or more primitives at least partially visible in a corresponding tile based on the per-tile pixel depth values of the primitives of the batch of primitives at least partially visible in the corresponding tile.

In embodiments, after completing a first depth sub-pass of a tile pre-pass stage, AU 114 is configured to store the per-tile geometry data 105 used in the first depth sub-pass, data resulting from the performance of the first depth sub-pass (e.g., depth textures, SSOA textures, SSR textures, occlusion data), or both in the per-tile queue allocated to the first queue. Additionally, after completing a first depth sub-pass of a tile pre-pass stage, AU 114 determines whether the first depth sub-pass was the final depth sub-pass indicated for the first tile pre-pass stage (e.g., the first depth sub-pass was the final depth sub-pass to be performed for the tile pre-pass stage as indicated by one or more commands in the command stream). Based on AU 114 determining that the first depth sub-pass was the final depth sub-pass indicated for the first tile pre-pass stage AU 114 ends the first tile pre-pass stage and initiates a first tile draw stage based on one or more second pixel states 125. Further, based on AU 114 determining that the first depth sub-pass was not the final depth sub-pass indicated for the first tile pre-pass stage, AU 114 begins a second depth sub-pass of the first tile pre-pass stage based on a second set of one or more first pixel states 125. For example, AU 114 performs a second depth sub-pass operation that differs from the first depth sub-pass operation.

After completing the second depth sub-pass of the first tile pre-pass stage, in embodiments, AU 114 stores data resulting from the performance of the second depth pass (e.g., depth textures, SSOA textures, SSR textures, occlusion data) in the per-tile queue allocated to the first queue. AU 114 then determines whether the second depth sub-pass was the final depth sub-pass indicated for the first tile pre-pass stage. Based on AU 114 determining that the second depth sub-pass was the final depth sub-pass indicated for the first tile pre-pass stage, AU 114 ends the first tile pre-pass stage and initiates a first tile draw stage based on one or more second pixel states 125. Further, based on AU 114 determining that the second depth sub-pass was not the final depth sub-pass indicated for the first tile pre-pass stage, the per-tile queue allocated to the first tile is not at a threshold capacity, or both AU 114 begins a third depth sub-pass of the first tile pre-pass stage based on a third set of one or more first pixel states. AU 114 then continues performing depth sub-passes for the first tile pre-pass stage until the final depth sub-pass indicated for the first tile pre-pass stage has been completed, at which point the AU initiates a first tile draw stage for the first tile based on one or more second pixel states 125. In this way, AU 114 is configured to perform multiple depth sub-passes each having different parameters (e.g., thresholds) for each tile, allowing AU 114 to generate textures (e.g., depth textures, SSOA textures, SSR textures) and occlusion data that is later used to render and light the primitives without adding to the load of the later stages (e.g., groups of commands) of the tile-based immediate mode renderer graphics pipeline 124.

In embodiments, to perform the first tile draw stage, AU 114 is configured to first render the primitives of the batch of primitives at least partially visible in the first tile to one or more PPC buffers formed from at least a portion of caches 122, memory 106, or both. To this end, AU 114 is configured to render the primitives of the batch of primitives at least partially visible in the first tile based on the per-tile geometry data 105 stored in the per-tile queue associated with the first tile. As an example, AU 114 first consumes the per-tile queue associated with the first tile of the per-tile geometry data 105 representing the primitives of the batch of primitives at least partially visible in the first tile. Based on one or more second pixel states 125, AU 114 then assembles, rasterizes, and shades the primitives using the per-tile geometry data 105 to produce per-tile pixel attribute data that is stored in the PPC buffers and per-tile pixel depth data that is stored in a depth buffer (e.g., Z-buffer) formed from at least a portion of caches 122, memory 106, or both. Such per-tile pixel attribute data represents the attributes (e.g., color, position) of the pixels forming the primitives of the patch of primitives at least partially visible in the tile and such per-tile pixel depth data represents the depth of the pixels forming the primitives of the batch of primitives at least partially visible in the tile.

According to embodiments, the tile draw stage further includes AU 114 performing one or more depth culling techniques based on the per-tile pixel depth data in the Z-buffer and one or more second pixel states 125. For example, for each pixel forming a primitive of the batch of primitives at least partially visible in a tile, AU 114 compares the depth value of the pixel to one or more predetermined threshold values. Based on the comparison of the depth value of the pixel to the predetermined threshold values, AU 114 then culls the pixel from the Z-buffer, PPC buffers, or both by, for example, not storing the pixel attribute data or pixel depth data in the PPC buffers or Z-buffer, respectively. As an example, based on a comparison of the depth value of a pixel to the predetermined threshold values indicating that the pixel is at least partially occluded (e.g., at least a portion of the pixel is not visible in the scene), AU 114 then culls the pixel.

After completing a tile draw stage for a first tile, AU 114 performs a tile lighting stage for the first tile. During such a tile lighting stage, AU 114 performs one or more pixel-shading operations as indicated in one or more third pixel states 125 so as to determine lighting values (e.g., intensity values) that represent the direct and indirect lighting for each pixel forming primitives of the batch of primitives at least partially visible in the tile using the per-tile pixel attribute data in the PPC buffers. AU 114 then stores pixel values representing the color and lighting (e.g., intensity) of each pixel forming primitives at least partially visible in the tile in a frame buffer formed from at least a portion of caches 122, memory 106, or both. In some embodiments, once AU 114 has determined the lighting values for each pixel forming primitives at least partially visible in the tile, AU 114 discards the per-tile pixel attribute data stored in the PPC buffers associated with the tile. For example, based on one or more commands from an application 108, AU 114 discards the per-tile pixel attribute data stored in the PPC buffers associated with the tile after performing the commands included in a tile lighting stage for the tile. After performing the tile pre-pass stage, tile draw stage, tile lighting stage, or any combination thereof for the first tile, AU 114 performs a tile pre-pass stage, tile draw stage, and tile render stage for each other tile of the frame so as to render the primitives in the batch of primitives. After rendering the primitives in the batch of primitives, AU 114 renders a second batch of primitives based on geometry data determined during the geometry stage by performing a tile pre-pass stage, tile draw stage, and tile lighting stage for each tile of the frame. The AU 114 continues in this way until all the primitives in the frame are rendered.

In this way, AU 114 is configured to implement a tile-based immediate mode renderer graphics pipeline 124 with per-tile depth pre-passes. Because tile-based immediate mode renderer graphics pipeline 124 has AU 114 rendering primitives based on a single command stream from an application 108, processing system 100 is not required to manage in-memory state objects to allow access to stored states by AU 114, reducing the complexity and resources required to render the primitives. Additionally, due to tile-based immediate mode renderer graphics pipeline 124 requiring AU 114 to determine pixel light values from the per-tile pixel attribute data in the PPC buffers, the assembly and shading of primitives done during the tile draw stages are not repeated during the tile lighting stages, helping to reduce the processing resources and processing time needed to render the primitives. Further, because tile-based immediate mode renderer graphics pipeline 124 includes rendering primitives tile by tile rather than for the entire frame at once, the processing resources needed at any one time are reduced, helping to decrease the power consumption and improve the processing efficiency of processing system 100.

According to some embodiments, after AU 114 has completed a tile draw stage for a first tile, AU 114 releases the per-tile pixel attribute data in the PPC buffers and performs a tile lighting stage using the released per-tile pixel attribute data. For example, based on an application 108 providing one or more commands to release the per-tile pixel attribute data (e.g., at a frame buffer level), AU 114 releases the per-tile pixel attribute data after completing the tile draw stage for the first tile and performs a tile lighting stage for the first tile. Further, in some embodiments, while AU 114 releases per-tile pixel attribute data in the PPC buffers to perform a tile lighting stage for a first tile, AU 114 is configured to perform a tile pre-pass stage for a second tile of the frame, a tile draw stage for a second tile of the frame, a tile lighting stage for a second tile of the frame, or any combination thereof. As an example, while the per-tile pixel attribute data in the PPC buffers is released to perform a tile lighting stage for a first tile, AU 114 performs a tile pre-pass stage for a second tile. Due to AU 114 performing such stages (e.g., groups of commands) while per-tile pixel attribute data is released from the PPC buffers, AU 114 is not required to wait for the per-tile pixel attribute data to release before starting a next stage of the tile-based immediate mode renderer graphics pipeline 124, helping reduce pauses between the stages and helping to decrease the time needed to render the primitives. A person of ordinary skill in the art will appreciate that the release and acquisition of such per-tile pixel attribute data is based on commands issued from one or more applications 108 and, as such, represents an example implementation of tile-based immediate mode renderer graphics pipeline 124.

In embodiments, the processing system 100 also includes a central processing unit (CPU) 102 that is connected to the bus 112 and therefore communicates with the AU 114 and the memory 106 via the bus 112. The CPU 102 implements a plurality of processor cores 104-1 to 104-N that execute instructions concurrently or in parallel. In implementations, one or more of the processor cores 104 operate as SIMD units that perform the same operation on different data sets. For example, one or more processor cores 104 operate as SIMD units each having two or more lanes each configured to perform an operation (e.g., spatial test) of a wave. Though in the example implementation illustrated in FIG. 1, three processor cores (104-1, 104-2, 104-M) are presented representing an M number of cores, the number of processor cores 104 implemented in the CPU 102 is a matter of design choice. As such, in other implementations, the CPU 102 can include any number of processor cores 104. In some implementations, the CPU 102 and AU 114 have an equal number of processor cores 104, 116 while in other implementations, the CPU 102 and AU 114 have a different number of processor cores 104, 116. The processor cores 104 execute instructions such as program code 110 for one or more applications 108 stored in the memory 106 and the CPU 102 stores information in the memory 106 such as the results of the executed instructions. The CPU 102 is also able to initiate graphics processing by issuing a command stream from one or more applications 108 to AU 114.

Processing system 100 also includes an input/output (I/O) engine 118 that includes hardware and software to handle input or output operations associated with the display 120, as well as other elements of the processing system 100 such as keyboards, mice, printers, external disks, and the like. The I/O engine 118 is coupled to the bus 112 so that the I/O engine 118 communicates with the memory 106, the AU 114, or the CPU 102.

Figure 2:
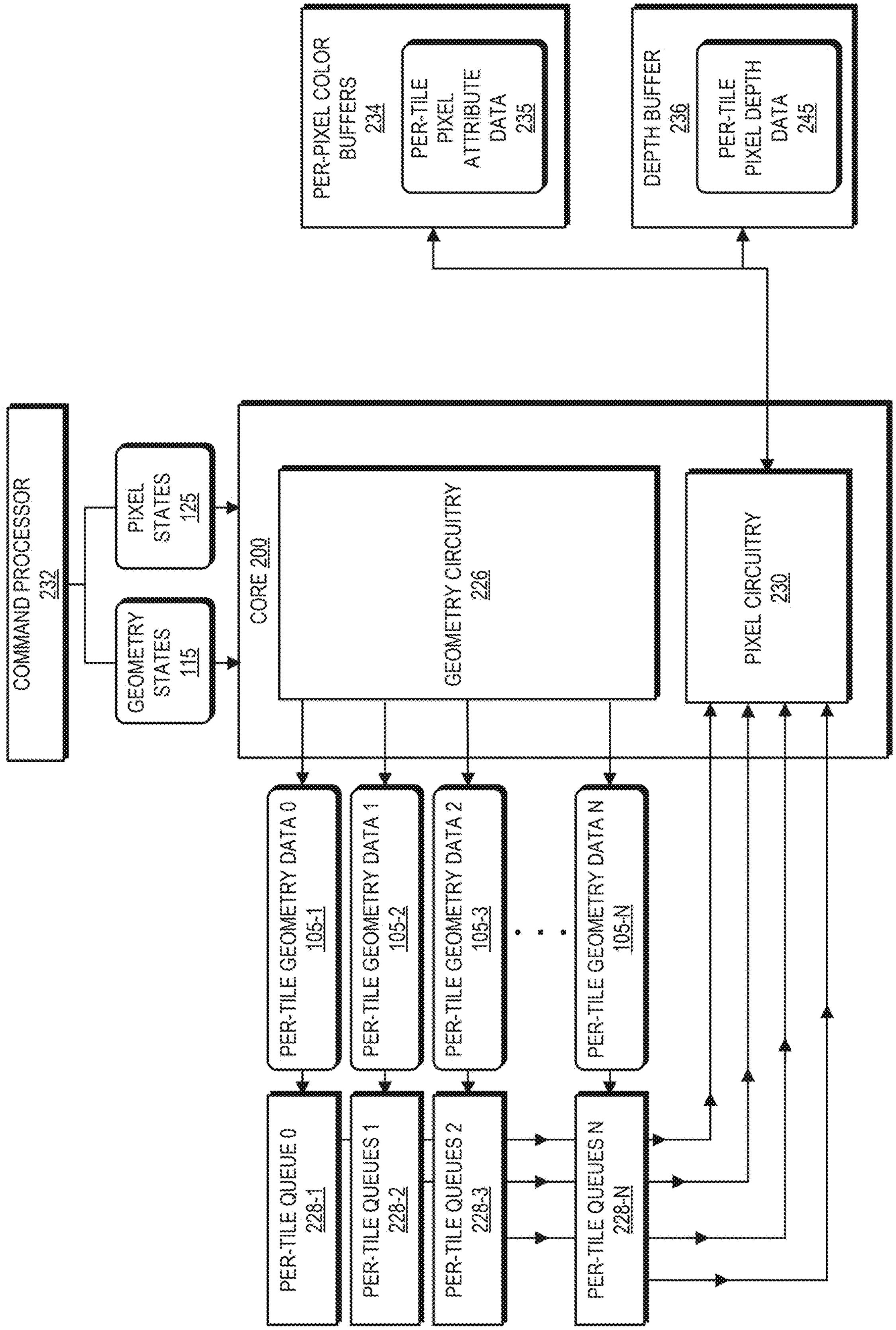
FIG. 2 is a block diagram of an example processor core configured to implement at least a portion of a tile-based immediate mode renderer graphics pipeline with per-tile depth pre-passes, in accordance with embodiments.

Referring now to FIG. 2, an example processor core 200 configured to implement at least a portion of a tile-based immediate mode renderer graphics pipeline with per-tile depth pre-passes is presented, in accordance with embodiments. In some embodiments, example processor core 200 is implemented within AU 114 as a processor core 116. According to embodiments, example processor core 200 is configured to implement at least a portion of tile-based immediate mode renderer graphics pipeline 124 by executing one or more instructions, operations, or both associated with tile-based immediate mode renderer graphics pipeline 124. To this end, example processor core 200 is connected to command processor 232. Command processor 232, for example, includes circuitry configured to receive a command stream from an application 108. Such a command stream, for example, includes one or more geometry states 115, pixel states 125, and data indicating one or more primitives to be rendered in a scene of a frame. Command processor 232 then provides data indicating the geometry states 115, pixel states 125, and primitives to be rendered (e.g., vertex data) to example processor core 200. Such geometry states 115, for example, include data (e.g. parameters) to initialize and dictate tile-based immediate mode renderer graphics pipeline 124, geometry stages of tile-based immediate mode renderer graphics pipeline 124, or both. Additionally, such pixel states 125 include data (e.g., parameters) to initialize and dictate tile pre-pass stages, tile draw stages, and tile lighting stages of the tile-based immediate mode renderer graphics pipeline 124. For example, one or more first pixel states 125 include data to initialize and dictate tile pre-pass stages of tile-based immediate mode renderer graphics pipeline 124, one or more second pixel states 125 include data to initialize and dictate tile draw stages of tile-based immediate mode renderer graphics pipeline 124, and one or more third pixel states 125 include data to initialize and dictate tile lighting stages of tile-based immediate mode renderer graphics pipeline 124.

Based on one or more first geometry states 115 provided from command processor 232, example processor core 200 initializes tile-based immediate mode renderer graphics pipeline 124. To this end, example processor core 200 first partitions the frame to be rendered into a number of tiles indicated by one or more first geometry states 115. Each tile, for example, includes a number of pixels in a first direction and a number of pixels in a second direction as indicated by one or more first geometry states 115. After partitioning the frame into tiles, example processor core 200 then allocates a per-tile queue 228 to each frame in a group of frames as indicated by the one or more first geometry states 115. For example, AU 114 allocates a first per-tile queue 0 228-1 to a first tile, a second per-tile queue 1 228-2 to a second tile, a third per-tile queue 2 228-3 to a third tile, and an Nth per-tile queue N 228-N to an Nth tile. Such per-tile queues 228 are each formed from at least a portion of caches 122, memory 106, or both and include one or more queues, for example, first in, first out (FIFO) queues. Though the example embodiment presented in FIG. 2 shows an example processor core 200 with four per-tile queues 228 representing an N number of per-tile queues 228 that support an N number of tiles of a frame, in other embodiments, example processor core 200 can include any number of per-tile queues 228 supporting any number of tiles of a frame. Further, in some embodiments, each per-tile queue 228 is formed from one or more per-shader engine queues of example processor for 200.

Based on one or more second geometry states 115 of the command stream, example processor core 200 then performs a geometry stage (e.g., visibility pass) to determine which primitives to be rendered for the frame are at least partially visible in each tile of the frame. To this end, example processor core 200 includes or is otherwise connected to a geometry circuitry 226 configured to implement one or more primitive assemblers, shaders (e.g., geometry shaders), or both so as to assemble and shade one or more primitives based on one or more second geometry states 115. As an example, based on one or more second geometry states 115 and data indicating the primitives to be rendered for the frame, geometry circuitry 226 assembles and shades one or more of the indicated primitives. Once geometry circuitry 226 has assembled and shaded the indicated primitives, geometry circuitry 226 then, for each assembled primitive, determines which tile the primitive is at least partially visible in. Based on an assembled primitive being at least partially visible in a tile, geometry circuitry 226 provides geometry data representing the vertex data, shading data, positioning data, or any combination of the primitive to the per-tile queue 228 allocated to the tile. In embodiments, geometry circuitry 226 is configured to perform the visibility pass until a certain command (e.g., tile flush command) is received from in the command stream, one or more groups of per-tile queues 228 are at a predetermined capacity threshold (e.g., store a predetermined amount of data), or both. Once a certain command (e.g., tile flush command) is received from in the command stream, one or more groups of per-tile queues 228 are at a predetermined capacity threshold (e.g., store a predetermined amount of data), or both, geometry circuitry 226 forms a batch of primitives to be rendered represented by the geometry data stored in the per-tile queues 228.

After geometry circuitry 226 has stored the geometry data representing each primitive of a batch of primitives at least partially visible in a tile to a corresponding per-tile queue 228, such stored data is represented in FIG. 2 as per-tile geometry data 105. Such per-tile geometry data (105-1, 105-2, 105-3, 105-N) each represents the vertex data, shading data, positioning data, or any combination of primitives in a batch of primitives at least partially visible within a corresponding tile. According to embodiments, once geometry circuitry 226 has stored the per-tile geometry data 105 for the batch of primitives in one or more per-tile queues 228, example processor core 200 is configured to perform a tile pre-pass stage for the first tile based on one or more first pixel states 125. As an example, concurrently with geometry circuitry 226 completing the remainder of the geometry stage, example processor core 200 is configured to perform a tile pre-pass stage for the first tile based on one or more first pixel states 125. To this end, example processor core 200 includes pixel circuitry 230 configured to implement one or more assemblers, shaders (e.g., vertex shaders, fragment shaders), or both based on corresponding pixel states 125. According to embodiments, pixel circuitry 230 includes two or more instances of pixel circuitry 230 (e.g., pixel engines) each associated with a corresponding per-tile queue 228. For example, while example processor core 200 initializes tile-based immediate mode renderer graphics pipeline 124 based on the first geometry state 115, example processor core 200 forms two or more per-tile queues 228 each associated with (e.g., allocated to) a corresponding instance of pixel circuitry 230 such that each instance of pixel circuitry 230 consumes generated per-tile geometry data 105 from an allocated per-tile queue 228 to perform a tile pre-pass stage, tile draw stage, or both of tile-based immediate mode renderer graphics pipeline 124.

In embodiments, to perform a tile pre-pass stage of tile-based immediate mode renderer graphics pipeline 124 for a first tile based on one or more first pixel states 125, pixel circuitry 230 is configured to consume the per-tile queue 228 (e.g., per-tile queue 0 228-1) associated with the first tile so as to retrieve the per-tile geometry data (e.g., per-tile geometry data 0 105-1) associated with the first tile. After retrieving the per-tile geometry data 105 associated with the first tile, pixel circuitry 230 then assembles, rasterizes, and shades the primitives of the batch of primitives indicated in the per-tile geometry data 105 based on one or more first pixel states 125 to produce per-tile pixel depth data 245 that is stored in a Z-buffer 236. Such a Z-buffer 236, for example, includes a buffer formed from at least a portion of caches 122, memory 106, or both. Additionally, the per-tile pixel depth data 245 stored in the Z-buffer 236 represents the depth of the pixels forming the primitives of the batch of primitives at least partially visible in the first tile. Using the per-tile pixel depth data 245, pixel circuitry 230 then performs a first depth sub-pass based on a first set of one or more first pixel states 125. A depth sub-pass, for example, includes performing one or more depth sub-pass operations such as an SSAO operation, SSR operation, occlusion culling operation, or the like. As an example, in embodiments, a depth sub-pass includes comparing one or more depth values indicated in the per-tile pixel depth data 245 to a minimum depth value threshold and a maximum depth value threshold as indicated in a first set of one or more first pixel states. Based on the comparison, pixel circuitry 230 then generates one or more textures such as SSAO or SSR textures, culls one or more occluded pixels, or both. For example, based on the comparison, pixel circuitry 230 generates a list of occluded pixels within the first tile. As another example, based on the comparison, pixel circuitry 230 generates an SSAO texture for the first tile. After performing a first depth sub-pass of the first tile pre-pass stage, pixel circuitry 230 stores the per-tile geometry data 105 used in the first depth depth-pass, data (e.g., SSAO textures, SSR textures, occlusion data) resulting from the performance of the first depth sub-pass, or both in the per-tile queue 228 allocated to the first queue.

Additionally, after performing a first depth sub-pass of the first tile pre-pass stage, pixel circuitry 230 is configured to determine whether the first depth sub-pass was the final depth sub-pass of the first tile pre-pass stage (e.g., the first depth sub-pass was the last depth sub-pass to be completed for the first tile pre-pass stage as indicated by one or more commands of the command stream. Based on the first depth sub-pass being the final depth sub-pass of the first tile pre-pass stage, pixel circuitry 230 is configured to perform a tile draw stage for the first tile based on one or more second pixel states 125. Further, based on the first depth sub-pass not being the final depth sub-pass of the first tile pre-pass stage, pixel circuitry 230 is configured to perform a second depth sub-pass of the first tile pre-pass stage. To this end, pixel circuitry 230 performs a second depth sub-pass operation according to a second set of first pixel states 125. In some embodiments, the second depth sub-pass includes performing the same depth sub-pass operation that was performed for the first depth sub-pass, while in other embodiments, the second depth sub-pass includes performing a different depth sub-pass operation than was performed for the first depth sub-pass.

Once the second depth sub-pass has been performed, pixel circuitry 230 then stores data (e.g., textures, occlusion data) resulting from the performance of the second depth sub-pass in the per-tile queue 228 allocated to the first tile. Pixel circuitry 230 then determines whether the second depth sub-pass was the final depth sub-pass of the first tile pre-pass stage (e.g., the second depth sub-pass was the last depth sub-pass to be completed for the first tile pre-pass stage as indicated by one or more commands of the command stream). Based on the second depth sub-pass being the final depth sub-pass of the first tile pre-pass stage, pixel circuitry 230 is configured to perform a tile draw stage for the first tile based on one or more second pixel states 125. Further, based on the second depth sub-pass not being the final depth sub-pass of the first tile pre-pass stage, pixel circuitry 230 is configured to perform subsequent depth sub-passes of the first tile pre-pass stage using corresponding sets of first pixel states. Each of this subsequent depth sub-passes, for example include pixel circuitry 230 perform a depth sub-pass operation different from the depth sub-pass operation performed during the first depth sub-pass, the second depth sub-pass, or one or more other subsequent depth sub-passes. According to embodiments, one or more of these subsequent depth sub-passes include performing a depth sub-pass operation different from the sub-pass operation performing during the first depth sub-pass, the second depth sub-path, one or more other subsequent depth sub-passes, or any combination thereof. Pixel circuitry 230 continues performing depth sub-passes for the first tile pre-pass stage and storing data resulting from these depth sub-pass in the per-tile queue 228 allocated to the first tile in this way until the final depth sub-pass of the first tile pre-pass stage is completed. After the final depth sub-pass of the first tile pre-pass stage is completed, the per-tile queue 228 allocated to the first tile reaches a threshold capacity, or both, pixel circuitry 230 then initiates and performs the first tile draw stage of tile-based immediate mode renderer graphics pipeline 124 based on one or more second pixel states 125.

To perform a tile draw stage of tile-based immediate mode renderer graphics pipeline 124 for a first tile based on one or more second pixel states 125, pixel circuitry 230 is configured to first consume the per-tile queue 228 (e.g., per-tile queue 0 228-1) associated with the first tile so as to receive the per-tile geometry data 105 (e.g., per-tile geometry data 0 105-1) associated with the first tile. After obtaining the per-tile geometry data 105 associated with the first tile, pixel circuitry 230 then renders the primitives indicated in the per-tile geometry data 105 as a batch (e.g., coarse batch) to one or more PPC buffers 234 based on one or more second pixel states 125. That is to say, AU 114 assembles, rasterizes, and shades the primitives indicated in the per-tile geometry data 105 based on one or more second pixel states 125 to produce per-tile pixel attribute data 235 that is stored in the PPC buffers 234. Further, based on assembling, rasterizing, and shading these primitives based on per-tile geometry data 105, pixel circuitry 230 produces per-tile pixel depth data 245 that is stored in a Z-buffer 236. The PPC buffers 234 and Z-buffer 236, for example, each one or more buffers formed from at least corresponding portions of caches 122, memory 106, or both. As an example, PPC buffers 234 include one or more buffers configured to store data indicating the color and position of each pixel of a frame and Z-buffer 236 includes one or more buffers configured to store data indicating the depth values of each pixel of the frame.

In embodiments, the per-tile pixel attribute data 235 stored in the PPC buffers 234 after performing a tile draw stage for the first tile represents, for example, the attributes (e.g., color, position) of the pixels forming the primitives of the batch of primitives at least partially visible in the first tile and the per-tile pixel depth data 245 stored in the Z-buffer 236 represents the depth of the pixels forming the primitives of the batch of primitives at least partially visible in the first tile. According to embodiments, a tile draw stage further includes pixel circuitry 230 performing one or more depth culling techniques on the per-tile pixel depth data 245 as indicated by one or more first pixel states 125. As an example, for each pixel forming a primitive at least partially visible in a tile, AU 114 compares the depth value of the pixel indicated in the per-tile pixel depth data 245 to one or more pre-determined threshold values indicated in one or more first pixel states 125. Based on the comparison of the depth value of the pixel to the predetermined threshold values, pixel circuitry 230 culls the pixel from the Z-buffer 236, PPC buffers 234, or both by, for example, not providing the per-tile pixel attribute data 235 or per-tile pixel depth data 245 associated with the pixel to the PPC buffers 234 or Z-buffer 236, respectively. As an example, based on a comparison of the depth value of a pixel as indicated by per-tile pixel depth data 245 to the predetermined threshold values indicating that the pixel is at least partially occluded (e.g., at least a portion of the pixel is not visible in the scene), pixel circuitry 230 then culls the pixel from the Z-buffer 236, PPC buffers 234, or both.

After pixel circuitry 230 has completed the tile draw phase for the first tile and based on one or more third pixel states 125, pixel circuitry 230 performs a lighting stage of the tile-based immediate mode renderer graphics pipeline 124 for the first tile. For example, as indicated by the one or more third pixel states 125, pixel circuitry 230 performs one or more pixel-shading operations using the per-tile pixel attribute data 235 associated with the first tile so as to determine lighting values (e.g., intensity values) that represent the direct and indirect lighting for each pixel forming primitives at least partially visible in the first tile. Pixel circuitry 230 then stores the pixel values representing the color and lighting (e.g., intensity) of each pixel forming primitives at least partially visible in the tile in a frame buffer (not shown for clarity) formed from at least a portion of caches 122, memory 106, or both.

According to some embodiments, based on one or more commands from an application 108, pixel circuitry 230 is configured to release the per-tile pixel attribute data 235 associated with the first tile from the PPC buffers 234 to perform a tile lighting stage for the first tile. To this end, while pixel circuitry 230 releases the per-tile pixel attribute data 235 associated with the first tile from the PPC buffers 234, AU 114 is configured to perform a tile pre-pass stage for a second tile of the frame, a tile draw stage for a second tile of the frame, a tile lighting stage for a second tile of the frame, or any combination thereof. As an example, while the per-tile pixel attribute data 235 associated with the first tile is released and based on one or more corresponding pixel states 125, pixel circuitry 230 performs a tile pre-pass stage for a second tile.

Figure 3:
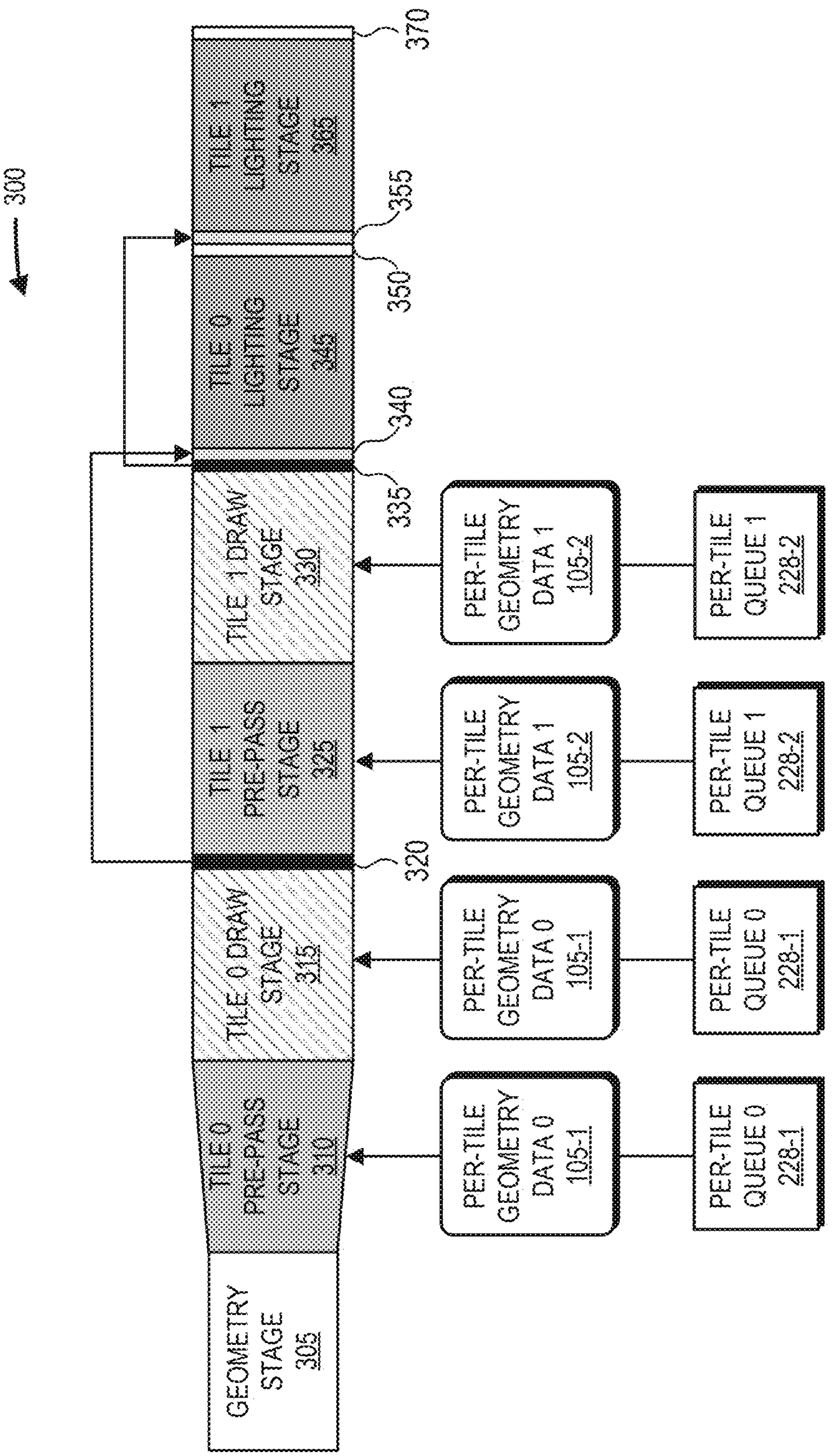
FIG. 3 is a timeline of an example tile-based immediate mode renderer graphics pipeline with per-tile depth pre-passes, in accordance with embodiments.

Referring now to FIG. 3, an example tile-based immediate mode renderer graphics pipeline 300 with per-tile depth pre-passes is presented, in accordance with embodiments. According to embodiments, example tile-based immediate mode renderer graphics pipeline 300 is implemented by AU 114. For example, in embodiments, after example tile-based immediate mode renderer graphics pipeline 300 is initialized, example tile-based immediate mode renderer graphics pipeline 300 first includes AU 114 performing a geometry stage 305 based on one or more first geometry states 115. During the geometry stage 305, AU 114 is configured to determine which primitives of a batch of primitives to be rendered for a frame are at least partially visible in each tile of the frame. To this end, AU 114 assembles and shades one or more primitives to be rendered in the frame based on one or more first geometry states 115. For each assembled primitive, AU 114 then determines in which tiles the assembled primitive is at least partially visible (e.g., present). In response to AU 114 determining that an assembled primitive is at least partially visible in a tile, AU 114 provides geometry data (e.g., per-tile geometry data 105) indicating vertex data, shading data, positioning data, or any combination of the primitive to the per-tile queue 228 allocated to the tile.

According to some embodiments, during the geometry stage 305, AU 114 is configured to assemble primitives and determine which tiles the assembled primitives are at least partially visible in until a certain command (e.g., tile flush command) is received in the command stream, one or more groups of per-tile queues 228 are at a predetermined capacity threshold (e.g., store a predetermined amount of data), or both. After the certain command is received in the command stream, one or more groups of per-tile queues 228 are at a predetermined capacity threshold, or both, AU 114 forms a batch of primitives to be rendered that are represented by the per-tile geometry data 105 stored in the per-tile queues 228. That is to say, AU 114 is configured to form a batch of primitives to be rendered based on a certain command being received in the command stream, one or more groups of per-tile queues 228 being at a predetermined capacity, or both. As an example, based on a per-tile queue 228 becoming full, AU 114 is configured to render a batch of primitives (e.g., the primitives represented by the per-tile geometry data in the per-tile queues 228) by performing a tile pre-pass stage, tile draw stage, and tile lighting stage for each tile of the frame. As another example, after initiating a visibility pass and based on the command stream received by AU 114 indicating a flush tile command, AU 114 is configured to render a batch of primitives by performing a tile pre-pass stage, tile draw stage, and tile lighting stage for each tile of the frame.

To render primitives in a first batch of primitives, AU 114 is configured to begin a tile 0 pre-pass stage 310. For example, concurrently with completing the remainder of geometry stage 305, AU 114 is configured to begin a tile 0 pre-pass stage 310 based on one or more first pixel states 125. During the tile 0 draw stage 315, AU 114 first determines per-tile pixel depth data 245 for the primitives of the batch of primitives at least partially visible in the first tile. To this end, AU 114 assembles, rasterizes, and shades, or any combination thereof the primitives indicated in the per-tile geometry data 105 stored in the per-tile queue 228 associated with the first tile based on one or more first pixel states 125 to produce the per-tile pixel depth data 245 associated with the first tile. For example, referring to the embodiment presented in FIG. 3, AU 114, based on one or more first pixel states, consumes per-tile queue 0 228-1 and generates per-tile pixel depth data 245 for the primitives of the batch of primitives at least partially visible in the first tile using per-geometry data 0 105-1. After generating the per-tile pixel depth data 245 for the first tile, AU 114 then performs a first depth sub-pass which includes performing a first depth sub-pass operation (e.g., SSAO operation, SSR operation, occlusion culling operation) based a first set of more first pixel states 125. After performing the first depth sub-pass, AU 114 stores the per-tile geometry data 105 used to generate the per-tile pixel depth data 245 of the first tile, data (e.g., textures, occlusion data) resulting from the performance of the first depth sub-pass, or both in the per-tile queue 228 allocated to the first tile (e.g., per-tile queue 0 228-1).

Once AU 114 has stored the per-tile geometry data 105 used to generate the per-tile pixel depth data 245 of the first tile, data (e.g., textures, occlusion data) resulting from the performance of the first depth sub-pass, or both in the per-tile queue 228 allocated to the first tile, AU 114 determines whether the first depth sub-pass was the final depth sub-pass indicated for the tile 0 pre-pass stage 310 (e.g., the first depth sub-pass was the final depth sub-pass to be performed for tile 0 pre-pass stage 310 as indicated by one or more commands in the command stream. Based on AU 114 determining that the first depth sub-pass was the final depth sub-pass indicated for tile 0 pre-pass stage 310, AU 114 ends tile 0 pre-pass stage and initiates tile 0 draw stage 315 based on one or more second pixel states 125. Further, based on AU 114 determining that the first depth sub-pass was not the final depth sub-pass indicated for tile 0 pre-pass stage 310, AU 114 begins a second depth sub-pass of the first tile pre-pass stage based on a second set of one or more first pixel states 125 different, for example, from the first set of one or more first pixel states 125 that defined the first depth sub-pass.

In embodiments, the second depth sub-pass includes AU 114 performing a different depth sub-pass operation from the depth sub-pass operation used during the first depth sub-pass. After completing the second depth sub-pass of the first tile pre-pass stage, AU 114 stores data resulting from the performance of the second sub-depth pass (e.g., depth textures, SSAO textures, SSR textures, occlusion data) in the per-tile queue 228 allocated to the first queue. AU 114 then determines whether the second depth sub-pass was the final depth sub-pass indicated for tile 0 pre-pass stage 310. AU 114 then continues performing depth sub-passes for tile 0 pre-pass stage 310 until the final depth sub-pass indicated for tile 0 pre-pass stage has been completed, at which point AU 114 initiates tile 0 draw stage 315 based on one or more second pixel states 125.

During the tile 0 draw stage 315, AU 114 renders the primitives of the batch of primitives at least partially visible in the first tile into the PPC buffers 234 based on the per-tile geometry data 105 stored in the per-tile queue 228 associated with the first tile. For example, referring to the embodiment presented in FIG. 3, AU 114 renders the primitives of the batch of primitives at least partially visible in the first tile based on per-tile geometry data 0 105-1 from per-tile queue 0 228-1. In embodiments, during the tile 0 draw stage 315, AU 114 first assembles, rasterizes, and shades the primitives indicated in per-tile geometry data 0 105-1 based on one or more second pixel states 125 so as to produce per-tile pixel attribute data 235 that is stored in one or more PPC buffers 234 and per-tile pixel depth data 245 that is stored in a Z-buffer 236. According to some embodiments, tile 0 draw stage 315 includes AU 114 performing a scissor operation based on the size of the tile. For example, based on one or more first pixel states, AU 114 discards per-tile pixel attribute data 235 and per-tile pixel depth data 245 associated with any pixels outside of a box based on the size and position of the tile (e.g., a box having the same size and position as the tile). Additionally, in some embodiments, tile 0 draw stage 315 includes AU 114 performing one or more depth culling techniques based on the determined per-tile pixel depth data 245. For example, for each pixel forming a primitive at least partially visible in a tile and based on one or more first pixel states 125, AU 114 compares the depth value of the pixel indicated in the per-tile pixel depth data 245 to one or more pre-determined threshold values. Based the comparison of the depth value of a pixel to the predetermined threshold values indicating that the pixel is at least partially occluded (e.g., at least a portion of the pixel is not visible in the scene), AU 114 then culls the pixel such that the per-tile pixel attribute data 235 and per-tile pixel depth data 245 associated with the pixel are not stored in the PPC buffers 234 and Z-buffer 236, respectively.

After AU 114 has performed tile 0 draw stage 315, in some embodiments, example tile-based immediate mode renderer graphics pipeline 300 includes AU 114 performing a release command 320 based on one or more commands indicated in the command stream. During the release command 320, AU 114 releases the per-tile pixel attribute data 235 associated with the first tile from the PPC buffers 234 such that AU 114 is enabled to perform a lighting stage (e.g., tile 0 lighting stage 345) for the first tile. Concurrently with AU 114 performing the release command 320, example tile-based immediate mode renderer graphics pipeline 300 includes AU 114 performing tile 1 pre-pass stage 325. During tile 1 pre-pass stage 325, AU 114 first determines per-tile pixel depth data 245 for the primitives at least partially visible in the second tile by assembling, rasterizing, and shading (e.g., vertex shading) the primitives indicated in the per-tile geometry data 105 stored in the per-tile queue 228 associated with the second tile based on a one or more first pixel states 125. From assembling, rasterizing, and shading (e.g., vertex shading) the primitives indicated in the per-tile geometry data 105 stored in the per-tile queue 228 associated with the second tile, AU 114 produces the per-tile pixel depth data 245 associated with the second tile. As an example, referring to the embodiment presented in FIG. 3, AU 114, based on one or more first pixel states, consumes per-tile queue 1 228-2 and generates per-tile pixel depth data 245 for the pixels at least partially visible in the second tile using per-geometry data 1 105-2. After generating the per-tile pixel depth data 245 of the second tile, AU 114 then performs, based on the first set of one or more first pixel states 125, a first depth sub-pass which includes performing a first depth sub-pass operation (e.g., SSAO operation, SSR operation, occlusion culling operation) based on the per-tile pixel depth data 245 of the second tile and one or more first thresholds indicated in one or more first pixel states 125. After performing the first depth sub-pass, AU 114 stores the per-tile geometry data 105 used to generate the per-tile pixel depth data 245 of the second tile, data (e.g., textures, occlusion data) resulting from the performance of the first depth sub-pass, or both in the per-tile queue 228 allocated to the second tile (e.g., per-tile queue 1 228-2).

Once AU 114 has stored the per-tile geometry data 105 used to generate the per-tile pixel depth data 245 of the second tile, data (e.g., textures, occlusion data) resulting from the performance of the first depth sub-pass, or both in the per-tile queue 228 allocated to the second tile, AU 114 determines whether the first depth sub-pass was the final depth sub-pass indicated for the tile 1 pre-pass stage 325 (e.g., the first depth sub-pass was the final depth sub-pass to be performed for tile 1 pre-pass stage 325 as indicated by one or more commands of the command stream). Based on AU 114 determining that the first depth sub-pass was the final depth sub-pass indicated for tile 1 pre-pass stage 325, AU 114 ends tile 1 pre-pass stage 325 and initiates tile 1 draw stage 330 based on one or more second pixel states 125. Additionally, based on AU 114 determining that the first depth sub-pass was not the final depth sub-pass indicated for tile 1 pre-pass stage 325, AU 114 begins a second depth sub-pass of tile 1 pre-pass stage 325 based on the second set of one or more first pixel states 125. After completing the second depth sub-pass of tile 1 pre-pass stage 325, AU 114 stores data resulting from the performance of the second depth sub-pass (e.g., depth textures, SSOA textures, SSR textures, occlusion data) in the per-tile queue 228 allocated to the second tile. AU 114 then determines whether the second depth sub-pass was the final depth sub-pass indicated for Tile 1 pre-pass stage 325. AU 114 then continues performing depth sub-passes for tile 1 pre-pass stage 325 until the final depth sub-pass indicated for tile 1 pre-pass stage 325 has been completed, at which point, AU 114 initiates tile 1 draw stage 330 based on a one or more second pixel states 125.

During the tile 1 draw stage 330, AU 114 renders the primitives of the batch of primitives at least partially visible in a second tile of the frame into the PPC buffers 234 based on the per-tile geometry data 105 stored in the per-tile queue 228 associated with the second tile. As an example, referring to the embodiment presented in FIG. 3, AU 114 renders the primitives at least partially visible in the second tile based on per-tile geometry data 1 105-2 from per-tile queue 1 228-2. According to embodiments, during the tile 1 draw stage 330, AU 114 renders the primitives indicated in per-tile geometry data 1 105-2 so as to produce per-tile pixel attribute data 235 associated with the second tile that is stored in one or more PPC buffers 234 and per-tile pixel depth data 245 associated with the second tile that is stored in a Z-buffer 236. In some embodiments, tile 1 draw stage 330 also includes AU 114 performing one or more scissor operations based on the size of the tile, depth-culling operations, or both based on one or more first pixel states 125. Once AU 114 has performed tile 1 draw stage 330, example tile-based immediate mode renderer graphics pipeline 300 includes AU 114 performing a release command 335 based on one or more commands in the command stream (e.g., based on one or more commands from an application 108). During the release command 335, AU 114 releases the per-tile pixel attribute data 235 associated with the second tile in the PPC buffers 234 such that AU 114 is enabled to perform a lighting stage (e.g., tile 1 lighting stage 365) for the second tile.

After release command 335, example tile-based immediate mode renderer graphics pipeline 300 includes AU 114 performing acquire command 340 based one or more commands from the command stream. During the acquire command 340, AU 114 acquires the per-tile pixel attribute data 235 associated with the first tile that was released from the PPC buffers 234 (e.g., based on release command 320). In response to AU 114 acquiring the per-tile pixel attribute data 235 associated with the first tile, AU 114 then performs tile 0 lighting stage 345 based on one or more third pixel states 125. During tile 0 lighting stage 345, AU 114 determines lighting values (e.g., intensity values) that represent the direct and indirect lighting for each pixel forming primitives of a batch of primitives at least partially visible in the first tile based on the released per-tile pixel attribute data 235 associated with the first tile. For example, based on the released per-tile pixel attribute data 235 associated with the first tile, AU 114 performs one or more shading operations (e.g., fragment shading operations), lighting operations, or both according to one or more third pixel states 125 to determine the lighting values for each pixel forming primitives at least partially visible in the first tile. AU 114 then stores pixel values representing the color and lighting (e.g., intensity) of each pixel forming primitives at least partially visible in the first tile in a frame buffer. Additionally, after AU 114 performs tile 0 lighting stage 345, according to some embodiments, example tile-based immediate mode renderer graphics pipeline 300 includes AU 114 performing discard command 350 based on one or more commands in the command stream. The discard command 350, for example, includes AU 114 discarding the per-tile pixel attribute data 235 associated with the first tile. For example, AU 114 removes the per-tile pixel attribute data 235 associated with the first tile from one or more PPC buffers 234 so as to create free entries in the PPC buffers 234.

After discard command 350, example tile-based immediate mode renderer graphics pipeline 300 includes AU 114 performing acquire command 355 based on one or more commands in the command stream during which AU 114 acquires the per-tile pixel attribute data 235 associated with the second tile that was released from the PPC buffers 234 (e.g., based on release command 335). In response to AU 114 acquiring the per-tile pixel attribute data 235 associated with the second tile, AU 114 then performs tile 1 lighting stage 365 based on one or more third pixel states. To perform tile 1 lighting stage 365, AU 114 performs, based on the released per-tile pixel attribute data 235 associated with the second tile, one or more shading operations (e.g., fragment shading operations), lighting operations, or both according to one or more third pixel states to determine lighting values (e.g., intensity values) that represent the direct and indirect lighting for each pixel forming primitives at least partially visible in the second tile. AU 114 then stores pixel values representing the color and lighting (e.g., intensity) of each pixel forming primitives at least partially visible in the second tile in the frame buffer. Further, after AU 114 performs tile 1 lighting stage 365, example tile-based immediate mode renderer graphics pipeline 300 includes AU 114 performing discard command 370 based on one or more commands in the command stream during which AU 114 discards the per-tile pixel attribute data 235 associated with the second tile from the PPC buffers 234.

Figure 4:
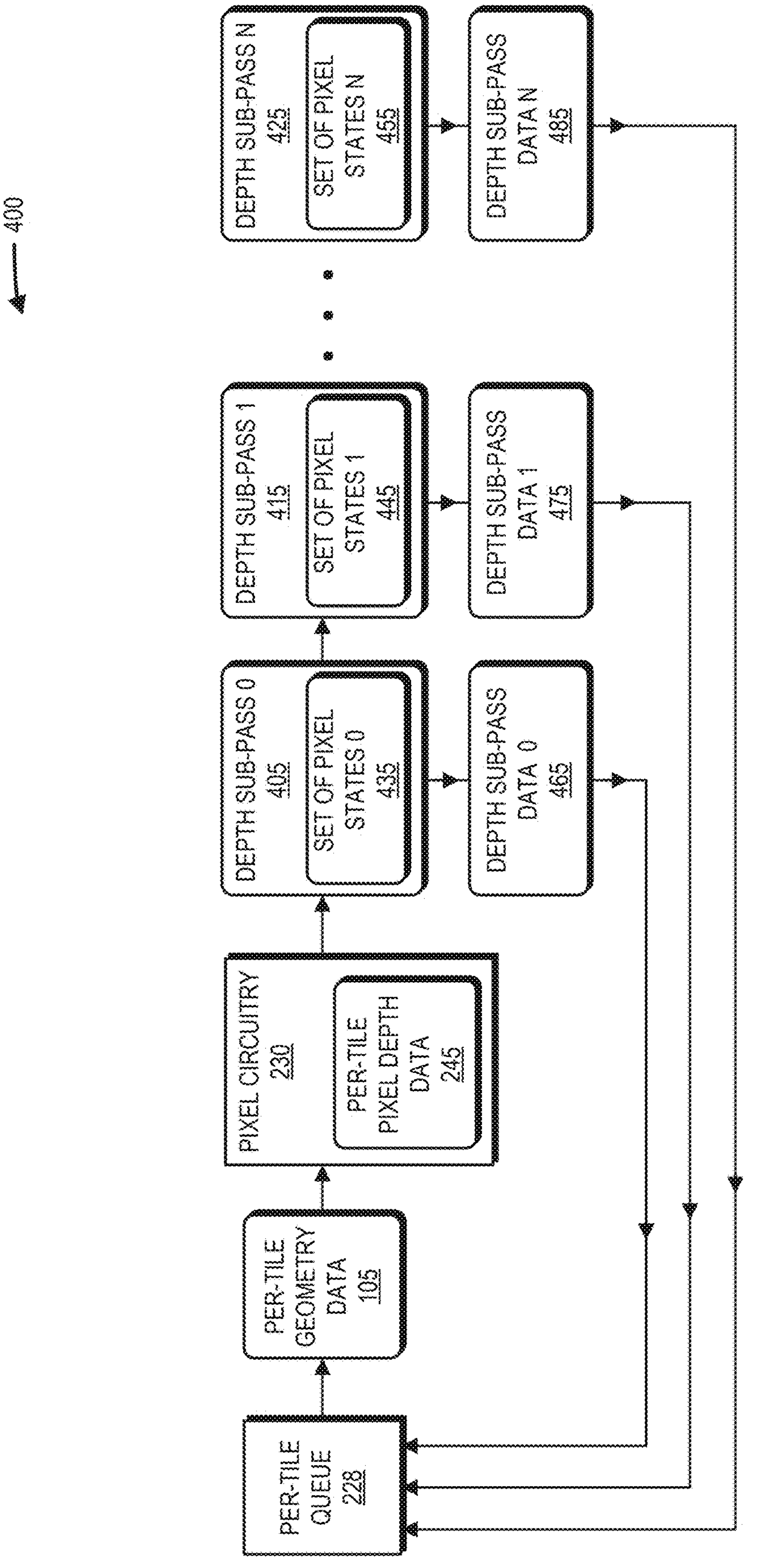
FIG. 4 is an example tile pre-pass stage of a tile-based immediate mode renderer graphics pipeline, in accordance with embodiments.

Referring now to FIG. 4, an example tile pre-pass stage 400 of a tile-based immediate mode renderer graphics pipeline is presented, in accordance with some embodiments. According to some embodiments, example tile pre-pass stage 400 is implemented as tile 0 pre-pass stage 310, tile 1 pre-pass stage 325, or both in example tile-based immediate mode renderer graphics pipeline 300. In embodiments, example tile pre-pass stage 400 includes pixel circuitry 230 of AU 114 receiving one or more pixel states (e.g., first pixel states) 125 indicating that example tile pre-pass stage 400 is to be initiated. Based on the pixel states 125, pixel circuitry 230 consumes a per-tile queue 228 allocated to a current tile so as to retrieve the per-tile geometry data 105 associated with the current tile. Using the per-tile geometry data 105 for the current tile, pixel circuitry 230 generates per-tile pixel depth data 245 representing depth values of pixels in the primitives at least partially visible in the current tile. According to some embodiments, after pixel circuitry 230 determines per-tile pixel depth data 245 for the current tile, pixel circuitry 230 stores the per-tile geometry data 105 used to generate the per-tile pixel depth data 245 in the per-tile queue 228 associated with the current tile. In this way, the per-tile geometry data 105 associated with the current tile is available for a subsequent tile draw stage for the current tile. Additionally, in embodiments, after pixel circuitry 230 determines per-tile pixel depth data 245, example tile pre-pass stage 400 includes pixel circuitry 230 performing a first depth sub-pass represented in FIG. 4 as depth sub-pass 0 405.

To perform depth sub-pass 0 405, pixel circuitry 230 is configured to perform a first depth sub-pass operation (e.g., SSAO operation, SSR operation, occlusion culling operation) based on a first set of pixel states 0 435 that includes, for example, one or more first pixel states 125. The first set of pixel states 0 435, for example, includes data indicating which depth sub-pass operation to perform, one or more thresholds (e.g., minimum depth value, maximum depth value) for the depth sub-pass operation, and the like. Further, such depth sub-pass data 0 465 represents the data resulting from the performance of the first depth sub-pass operation. As an example, when performing the first depth sub-pass operation of depth sub-pass 0 405, pixel circuitry 230 generates depth sub-pass data 0 that includes one or more textures (e.g., SSOA textures, SSR textures), data culling one or more pixels of the current tile, data culling one or more primitives at least partially visible in the current tile, or any combination thereof. For example, in some embodiments, pixel circuitry 230 performs an SSAO operation as defined by the first set of pixel states 0 435 using per-tile pixel depth data 245 to produce depth sub-pass data 0 465 that includes one or more SSAO textures. As another example, according to some embodiments, pixel circuitry 230 performs an occlusion culling operation as defined by the first set of pixel states 0 435 using per-tile pixel depth data 245 to produce depth sub-pass data 0 465 that includes data culling one or more pixels from the current tile such that per-tile pixel attribute data 235 associated with the culled pixels is not written to PPC buffer 234 during a subsequent tile draw stage. According to embodiments, after pixel circuitry 230 generates depth sub-pass data 0 465, pixel circuitry 230 stores depth sub-pass data 0 465 in the per-tile queue 228 allocated to the current tile.

In embodiments, after pixel circuitry 230 has stored depth depth-pass data 0 465 in the per-tile queue 228 allocated to the current tile, depth sub-pass 0 405 includes pixel circuitry 230 determining whether depth sub-pass 0 405 is the final depth sub-pass of example tile pre-pass stage 400 (e.g., depth sub-pass 0 405 is the last depth sub-pass to be performed for the example tile pre-pass stage 400 as indicated by one or more commands in the command stream). Based on depth sub-pass 0 405 being the final depth sub-pass of example tile pre-pass stage 400, AU 114 ends example tile pre-pass stage 400 and begins a next stage (e.g., set of commands) of tile-based immediate mode renderer graphics pipeline 124. Based on depth sub-pass 0 405 not being the final depth sub-pass of example tile pre-pass stage 400, pixel circuitry 230 performs a second depth sub-pass, represented in FIG. 4 as depth sub-pass 1 415.

During depth sub-pass 1 415, pixel circuitry 230 is configured to perform a second depth sub-pass operation (e.g., SSAO operation, SSR operation, occlusion culling operation) based on a second set of pixel states 1 445 that includes one or more first pixel states 125. In embodiments, such a second set of pixel states 1 445 indicates which depth sub-pass operation is to be performed for depth sub-pass 1 415, one or more thresholds (e.g., maximum depth value, minimum depth value) for the depth sub-pass operation, and the like. According to embodiments, the second set of pixel states 1 445 is different from the first set of pixel states 0 435, and the depth sub-pass operation performed for depth sub-pass 1 415 is different from the depth sub-pass operation performed for depth sub-pass 0 405. Such depth sub-pass data 1 475, for example, represents the data resulting from the performance of the depth sub-pass operation for depth sub-pass 1 415 such as SSAO textures, SSR textures, data indicating culled pixels, data indicating culled primitives, and the like. According to embodiments, after pixel circuitry 230 performs the depth sub-pass operation for depth sub-pass 1 415 and generates depth sub-pass data 1 475, pixel circuitry 230 stores depth sub-pass data 1 475 in the per-tile queue 228 allocated to the current tile.

Further, after pixel circuitry 230 has stored depth sub-pass data 1 475 in the per-tile queue 228 allocated to the current tile, depth sub-pass 1 415 includes pixel circuitry 230 determining whether depth sub-pass 1 415 is the final depth sub-pass of example tile pre-pass stage 400. Based on depth sub-pass 1 415 being the final depth sub-pass of example tile pre-pass stage 400, AU 114 ends example tile pre-pass stage 400 and beings a next stage (e.g., group of commands) of tile-based immediate mode renderer graphics pipeline 124. Based on depth sub-pass 1 415 not being the final depth sub-pass of example tile pre-pass stage 400, pixel circuitry 230 performs a third depth sub-pass, represented in FIG. 4 as depth sub-pass N 425. Though the example embodiment presented in FIG. 4 presents example tile pre-pass stage 400 as including three depth sub-passes (405, 415, 425) representing an N number of depth sub-passes, in other embodiments, example tile pre-pass stage 400 can include any number of depth sub-passes.

When performing depth sub-pass N 425, pixel circuitry 230 is configured to perform a third depth sub-pass operation (e.g., SSAO operation, SSR operation, occlusion culling operation) based on a third set of pixel states N 455 that includes one or more first pixel states. Such a third set of pixel states N 455, for example, indicates which depth sub-pass operation is to be performed for depth sub-pass N 425, one or more thresholds (e.g., maximum depth value, minimum depth value) for the depth sub-pass operation, and the like. According to embodiments, the third set of pixel states N 455 is different from the first set of pixel states 0 435, the second set of pixel states 1 445, or both, and the depth sub-pass operation performed for depth sub-pass N 425 is different from the depth sub-pass operation performed for depth sub-pass 0 405, depth sub-pass 1 415, or both. Additionally, such depth sub-pass data N 485 represents the data resulting from the performance of the depth sub-pass operation for depth sub-pass N 425 such as SSAO textures, SSR textures, data indicating culled pixels, data indicating culled primitives, and the like.

According to embodiments, after pixel circuitry 230 performs the depth sub-pass operation for depth sub-pass N 425 and generates depth sub-pass data N 485, pixel circuitry 230 stores depth sub-pass data N 485 in the per-tile queue 228 allocated to the current tile. Further, in embodiments, depth sub-pass N 425 includes pixel circuitry 230 determining whether depth sub-pass N 425 is the final depth sub-pass of example tile pre-pass stage 400. Because, according to the example embodiment presented in FIG. 4, depth sub-pass N 425 represents the final depth sub-pass of example tile pre-pass stage 400, pixel circuitry 230 determines that depth sub-pass N 425 is the final depth sub-pass of example tile pre-pass stage 400 and AU 114 ends example tile pre-pass stage 400. AU 114 then begins a next stage (e.g., group of commands) of tile-based immediate mode renderer graphics pipeline 124.

Figure 5:
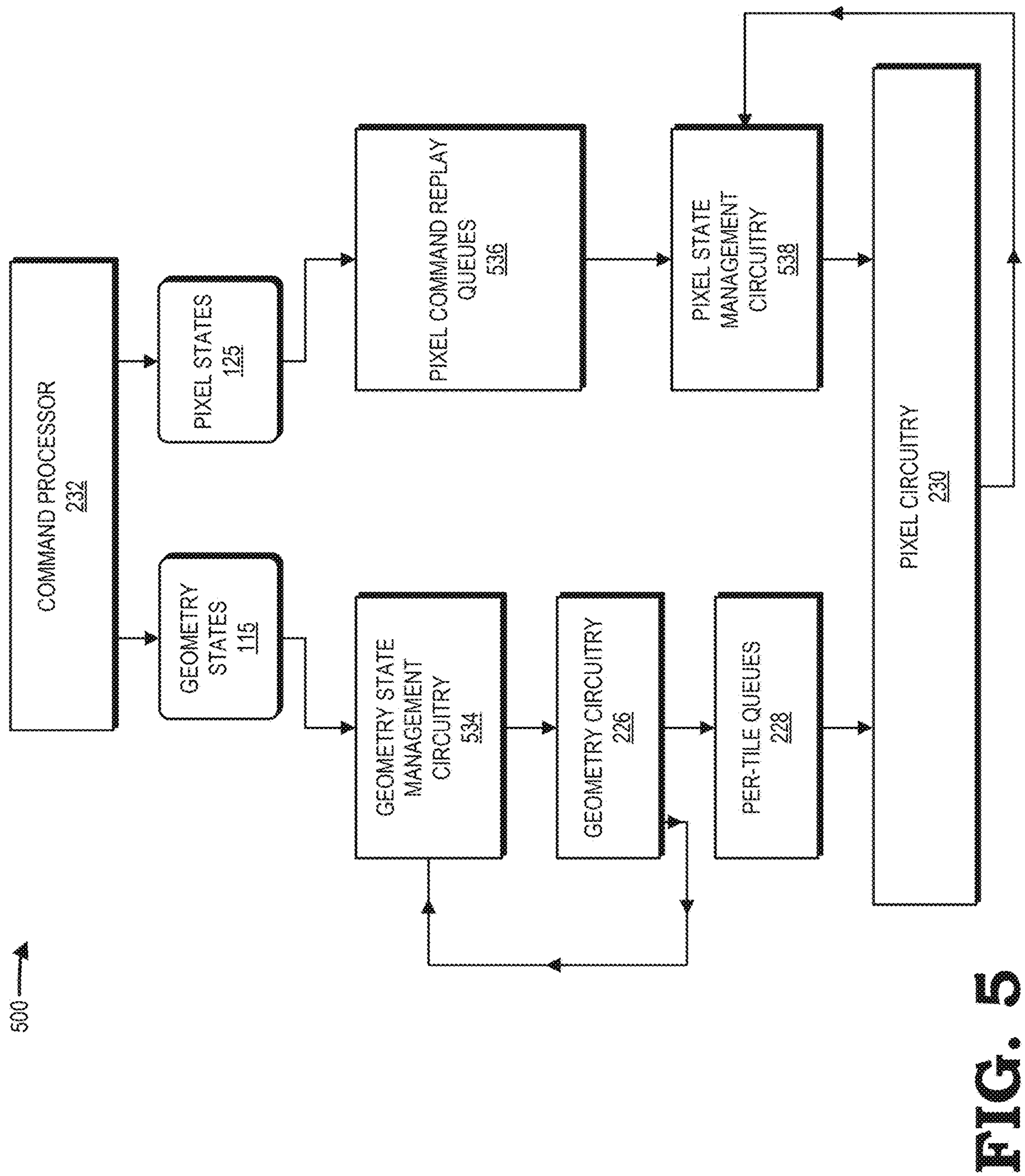
FIG. 5 is a block diagram of an example operation for managing geometry and pixel states for a tile-based immediate mode renderer graphics pipeline with per-tile depth pre-passes, in accordance with embodiments.

Referring now to FIG. 5, an example operation 500 for managing geometry and pixel states for a tile-based immediate-render graphics pipeline including per-tile depth pre-passes is presented, in accordance with some embodiments. In embodiments, example operation 500 is performed by AU 114 while implementing tile-based immediate mode renderer graphics pipeline 124. According to embodiments, example operation 500 first includes a command processor 232 receiving a command stream from, for example, CPU 102 that indicates one or more geometry states 115 and one or more pixel states 125 (e.g., first pixel states, second pixel states, third pixel states) for a scene to be rendered in a frame. Based on the received command stream, command processor 232 provides data indicating the geometry states 115 to a geometry state management circuitry 534. Such geometry state management circuitry 534, for example, is configured to store data indicating the geometry states 115 in one or more queues. For example, geometry state management circuitry 534 stores data indicating the geometry states 115 in the received command stream in one or more FIFO queues. Geometry state management circuitry 534 then passes the stored data indicating the geometry states 115 to geometry circuitry 226 so as to initiate and perform one or more stages (e.g., groups of commands) of tile-based immediate mode renderer graphics pipeline 124. For example, geometry state management circuitry 534 passes data indicating one or more first geometry states 115 to geometry circuitry 226 so as to induce geometry circuitry 226 to initialize tile-based immediate mode renderer graphics pipeline 124. As another example, geometry state management circuitry 534 passes data indicating one or more second geometry states 115 to geometry circuitry 226 so as to induce geometry circuitry 226 to perform a geometry stage (e.g., geometry stage 305) that includes a visibility pass. As geometry circuitry 226 performs such a geometry stage, geometry circuitry 226 stores geometry data (e.g. per-tile geometry data 105) for each tile in a corresponding per-tile queue 228 allocated to the tile.

In embodiments, after geometry circuitry 226 has completed one or more tasks (e.g., visibility pass tasks, geometry shading tasks) of a geometry stage (e.g., a geometry stage induced by geometry state management circuitry 434), geometry circuitry 226 indicates to geometry state management circuitry 534 that one or more tasks have been completed. Geometry state management circuitry 534 then issues one or more next geometry states 115 to induce geometry circuitry 226 to perform a next task of the geometry stage. In some embodiments, each processor core 116 of AU 114 includes or is otherwise connected to a respective instance of geometry state management circuitry 543.

Additionally, in embodiments, based on the received command stream, example operation 500 includes command processor 232 provides data indicating the pixel states 125 to a one or more pixel command replay queues 536. Such pixel command replay queues 536, for example, include one or more FIFO queues formed from at least a portion of caches 122, memory 106, or both. According to embodiments, such pixel command replay queues 436 are configured to provide the pixel states 125 stored in the pixel command replay queues 536 in the order in which they were received by the pixel command replay queues 536 to pixel state management circuitry 538. Based on the pixel states 125 received from the pixel command replay queues 536, pixel state management circuitry 438 is configured to induce pixel circuitry 230 to initiate and perform tile pre-pass stages (e.g., tile pre-pass stages 310, 325), tile draw stages (e.g., tile draw stages 315, 330) and tile lighting stages (e.g., tile lighting stages 345, 365) for the tile-based immediate mode renderer graphics pipeline 124.

As an example, pixel state management circuitry 538 passes one or more first pixel states 125 from pixel command replay queues 536 to pixel circuitry 230 so as to induce pixel circuitry 230 to perform a tile pre-pass stage for a first tile of the frame. Based on the one or more first pixel states 125, pixel circuitry 230 then performs the tile pre-pass stage (e.g., performs one or more depth sub-pass operations) so as to produce depth pre-pass data (e.g., depth sub-pass data 465, 475, 485) for the first tile such as SSAO textures, SSR textures, occlusion culling data, and the like. After pixel circuitry 220 has completed the tile pre-pass stage for the first tile, pixel circuitry 220 then sends data to pixel state management circuitry 538 indicating that the tile pre-pass stage has been completed. Pixel state management circuitry 538 then provides corresponding pixel states 125 from the pixel command replay queues 536 to pixel circuitry 220 so as to induce pixel circuitry 220 to perform subsequent stages (e.g., groups of commands) for the tile-based immediate mode renderer graphics pipeline 124. Additionally, in embodiments, pixel state management circuitry 538 is configured to compare a pixel state 125 to be issued by pixel state management circuitry 538 to a current pixel state 125 received by pixel circuitry 220. That is to say, configured to compare a pixel state 125 to be issued to a most recently issued pixel state 125. Based on the comparison indicating that the pixel state 125 to be issued is the same as the pixel state 125 that was most recently issued, pixel state management circuitry 538 filters out the pixel state 125 to be issued and does not provide it to pixel circuitry 220. In some embodiments, each processor core 116 of AU 114 includes or is otherwise connected to a respective instance of pixel command replay queues 536, pixel state management circuitry 538, or any combination thereof.

Figure 6:
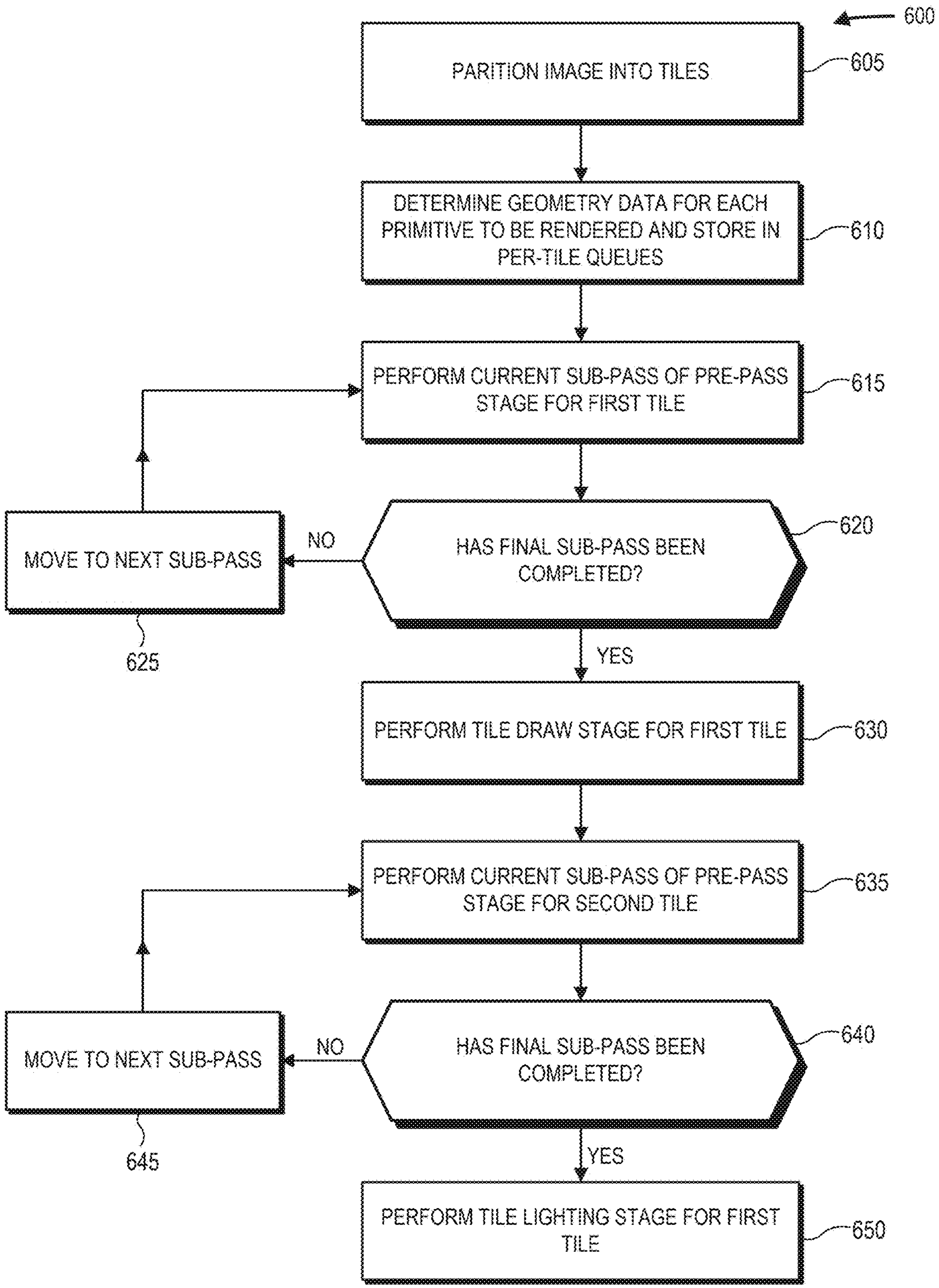
FIG. 6 is an example method for implementing a tile-based immediate mode renderer graphics pipeline with per-tile depth pre-passes, in accordance with embodiments.

Referring now to FIG. 6, an example method 600 for performing a tile-based immediate mode renderer graphics pipeline is presented, in accordance with embodiments. In embodiments, example method 600 is implemented by at least a portion of AU 114 (e.g. one or more processor cores 116 of AU 114). In embodiments, example method 600 first includes, at block 605, AU 114 receiving a command stream from CPU 102 indicating one or more geometry states 115 and one or more pixel states 125. Based on receiving such a command stream, AU 114 partitions a frame to be rendered into two or more tiles. Each tile, for example, includes a first number of pixels of the frame in a first direction and a second number of pixels of the frame in a second direction. Further, at block 605, AU 114 allocates a corresponding per-tile queue 228 to each tile of the frame. At block 610, example method 600 includes AU 114 determining per-tile geometry data 105 for each primitive of a batch of primitives to be rendered for the frame. To this end, AU 114 performs one or more assembly operations, shading operations (e.g., geometry shading operations), or both based on the geometry states 115 indicated in the command stream to produce one or more assembled primitives. For each assembled primitive, AU 114 then performs a visibility pass to determine which tiles each assembled primitive is at least partially visible in. Based on a primitive being at least partially visible within the tile, AU 114 stores geometry data (e.g., per-tile geometry data 105) indicating vertex data, shading data, positioning data, or any combination associated with the primitive in a per-tile queue 228 allocated to the tile. Once AU 114 has determined which tiles each assembled primitive is at least partially visible in, per-tile geometry data 105 associated with each primitive at least partially visible in the tile is stored in a corresponding per-tile queue 228.

At block 615, AU 114 performs a tile pre-pass stage (e.g., tile pre-pass stage 0 310) for a first tile of the frame. To this end, based on the per-tile geometry data 105 stored in the per-tile queue 228 allocated to the first tile, AU 114 first generates per-tile pixel depth data 245 for the first tile. For example, AU 114 assembles and shades (e.g., via vertex shading) the primitives indicated in the per-tile geometry data 105 stored in the per-tile queue 228 allocated to the first tile to produce per-tile pixel depth data 245. Using the per-tile pixel depth data 245, AU 114 then performs a first depth sub-pass operation (e.g., SSAO operation, SSR operation, occlusion culling operation) of the tile pre-pass stage. After AU 114 has performed the first depth sub-pass operation, AU 114 stores the depth sub-pass data (e.g., depth sub-pass data 465, 475, 485) resulting from the performance of the first depth sub-pass in the per-tile queue 228 allocated to the first tile. At block 620, AU 114 determines whether the first depth sub-pass was the final depth sub-pass of the tile pre-pass stage of the first tile. Based on the first depth sub-pass being the final depth sub-pass of the tile pre-pass stage of the first tile, AU 114, at block 630 beings a tile draw stage for the first tile.

Still referring to block 620, based on the first depth sub-pass not being the final depth sub-pass of the tile pre-pass stage of the first tile, AU 114, at block 625, moves to the next depth sub-pass of the tile pre-pass stage for the first tile. For example, AU 114 performs a second depth sub-pass operation different from the depth sub-pass operation to generate depth sub-pass data. AU 114 then stores the resulting depth sub-pass data for the second depth sub-pass operation in the per-tile queue 228 allocated to the first tile. AU 114 then, at block 620, determines whether the second depth sub-pass was the final depth sub-pass of the tile pre-pass stage of the first tile. Based on the second depth sub-pass being the final depth sub-pass of the tile pre-pass stage of the first tile, AU 114, at block 630, beings a tile draw stage for the first tile. Further, based on the second depth sub-pass not being the final depth sub-pass of the tile pre-pass stage of the first tile, AU 114 then, at block 625, moves to a next depth sub-pass of the tile pre-pass stage for the first tile. AU 114 then repeats blocks 615, 620, and 625 in this way until the final depth sub-pass of the tile pre-pass stage for the first tile has been performed. Afterwards, AU 114 begins a tile draw stage at block 630.

At block 630, AU 114 performs a tile draw stage (e.g., tile 0 draw stage 315) for a first tile of the frame. To this end, AU 114 renders the primitives at least partially visible in the first tile into one or more PPC buffers 234 based on the per-tile geometry data 105 stored in the per-tile queue 228 associated with the first tile. That is to say, AU 114 assembles, rasterizes, and shades the primitives indicated in per-tile geometry data 105 associated with the first tile so as to produce per-tile pixel attribute data 235 associated with the first tile that is stored in one or more PPC buffers and per-tile pixel depth data 245 associated with the first tile that is stored in a Z-buffer 236. In some embodiments, at block 630, the tile draw stage further includes AU 114 performing one or more scissor operations, depth culling operations, or both.

At block 635, AU 114 performs a tile pre-pass stage (e.g., tile 1 pre-pass stage 325) for a second tile of the frame. During the tile pre-pass stage for the second tile, AU 114 generates per-tile pixel depth data 245 for the second tile based on the per-tile geometry data 105 stored in the per-tile queue 228 allocated to the second tile. Using the per-tile pixel depth data 245 for the second tile, AU 114 then performs a first depth sub-pass operation (e.g., SSAO operation, SSR operation, occlusion culling operation). After AU 114 has performed the first depth sub-pass operation, AU 114 stores the depth sub-pass data (e.g., depth sub-pass data 465, 475, 485) resulting from the performance of the first depth sub-pass operation in the per-tile queue 228 allocated to the second tile. At block 630, AU 114 then determines whether the first depth sub-pass was the final depth sub-pass of the tile pre-pass stage of the second tile. Based on the first depth sub-pass not being the final depth sub-pass of the tile pre-pass stage of the second tile, AU 114, at block 650, performs a tile lighting stage for the first tile. Further, based on the first depth sub-pass not being the final depth sub-pass of the tile pre-pass stage of the second tile, AU 114, at block 645, moves to the next depth sub-pass of the tile pre-pass stage for the second tile. AU 114 then repeats blocks 635, 640, and 645 in this manner until the final depth sub-pass of the tile pre-pass stage for the second tile is performed. Afterward, at block 650, AU 114 initiates a tile lighting stage for the first tile.

At block 650, to perform a tile lighting stage (e.g., tile 0 lighting stage 345) for the first tile of the frame, AU 114 is configured to determine lighting values (e.g., intensity values) that represent the direct and indirect lighting for each pixel forming primitives at least partially visible in the first tile based on the released per-tile pixel attribute data 235 associated with the first tile. As an example, based on per-tile pixel attribute data 235 associated with the first tile, AU 114 performs one or more shading operations (e.g., fragment shading operations), lighting operations, or both to determine the lighting values for each pixel forming primitives at least partially visible in the first tile. AU 114 then stores pixel values representing the color and lighting (e.g., intensity) of each pixel forming primitives at least partially visible in the first tile in a frame buffer.

In some embodiments, the apparatus and techniques described above are implemented in a system including one or more integrated circuit (IC) devices (also referred to as integrated circuit packages or microchips), such as the AU described above with reference to FIGS. 1-6. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or another instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design shown herein, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An acceleration unit (AU), comprising:

a plurality of per-tile queues each allocated to a tile of a plurality of tiles of a frame to be rendered; and one or more processor cores configured to:

for each tile of the plurality of tiles:

write geometry data of one or more primitives of the frame to be rendered at least partially visible in the tile to a per-tile queue of the plurality of per-tile queues allocated to the tile; and based on the geometry data, perform a first depth sub-pass operation using a first threshold and a second depth sub-pass operation.

2. The AU of claim 1, wherein the one or more processor cores are configured to:

for each tile, render, to a buffer, pixel attribute data of the one or more primitives at least partially visible in the tile based on the geometry data.

3. The AU of claim 2, wherein the one or more processor cores are configured to:

for each tile of the plurality of tiles, based on the pixel attribute data of the one or more primitives at least partially visible in the tile, determine lighting data of the one or more primitives at least partially visible in the tile.

4. The AU of claim 2, wherein the one or more processor cores are configured to:

release, from the buffer, pixel attribute data of the one or more primitives at least partially visible in a first tile of the plurality of tiles; and concurrently with releasing the pixel attribute data, perform the first depth sub-pass operation based on pixel depth data of primitives at least partially visible in a second tile of the plurality of tiles.

5. The AU of claim 1, wherein the first depth sub-pass operation is different from the second depth sub-pass operation.

6. The AU of claim 1, wherein the first depth sub-pass operation is based on a first set of pixel states and the second depth sub-pass operation is based on a second set of pixel states that is different from the first set of pixel states.

7. The AU of claim 1, wherein the one or more processor cores are configured to:

for each tile of the plurality of tiles, perform a scissor operation on pixels of the one or more primitives at least partially visible in the tile.

8. A method, comprising:

partitioning a frame to be rendered into a plurality of tiles;

writing geometry data of one or more primitives of the frame to be rendered at least partially visible in a first tile of the plurality of tiles in a corresponding per-tile queue allocated to the first tile; and based on the geometry data of the one or more primitives of the frame to be rendered at least partially visible in the first tile, perform a first depth sub-pass operation and a second depth sub-pass operation.

9. The method of claim 8, further comprising:

rendering, to a buffer, pixel attribute data of the one or more primitives at least partially visible in the first tile based on the geometry data of the one or more primitives at least partially visible in the first tile.

10. The method of claim 9, further comprising:

based on the pixel attribute data of the one or more primitives at least partially visible in the first tile, determine lighting data of the one or more primitives at least partially visible in the first tile.

11. The method of claim 9, further comprising:

releasing, from the buffer, pixel attribute data of the one or more primitives at least partially visible in the first tile of the plurality of tiles; and concurrently with releasing the pixel attribute data, performing the first depth sub-pass operation based on geometry data of one or more primitives of the frame to be rendered at least partially visible in a second tile of the plurality of tiles.

12. The method of claim 8, wherein the first depth sub-pass operation is different from the second depth sub-pass operation.

13. The method of claim 8, wherein the first depth sub-pass operation is based on a first set of pixel states and the second depth sub-pass operation is based on a second set of pixel states that is different from the first set of pixel states.

14. The method of claim 8, further comprising:

performing a scissor operation on pixels of the one or more primitives at least partially visible in the first tile.

15. An acceleration unit (AU), comprising:

one or more caches; and one or more processor cores coupled to the one or more caches and configured to:

partition a frame to be rendered into a plurality of tiles;

based on pixel attribute data of primitives at least partially visible in a first tile of the plurality of tiles, perform a first depth sub-pass operation and a second depth sub-pass operation; and write pixel attribute data of primitives at least partially visible in the first tile to the one or more caches.

16. The AU of claim 15, wherein the one or more processor cores are configured to:

based on the pixel attribute data, determine lighting data for the primitives at least partially visible in the first tile.

17. The AU of claim 15, wherein the first depth sub-pass operation is different from the second depth sub-pass operation.

18. The AU of claim 15, wherein the first depth sub-pass operation is based on a first set of pixel states and the second depth sub-pass operation is based on a second set of pixel states that is different from the first set of pixel states.

19. The AU of claim 15, wherein the one or more processor cores are configured to:

release, from the one or more caches, pixel attribute data of one or more primitives at least partially visible in the first tile of the plurality of tiles; and concurrently with releasing the pixel attribute data, perform the first depth sub-pass operation based on geometry data of one or more primitives of the frame to be rendered at least partially visible in a second tile of the plurality of tiles.

20. The AU of claim 15, wherein the one or more processor cores are configured to:

perform a scissor operation on pixels of one or more primitives at least partially visible in the first tile.

* * * * *